(12) United States Patent
Forsberg

(10) Patent No.: US 10,934,109 B2
(45) Date of Patent: Mar. 2, 2021

(54) SWEEP CONVEYOR ASSEMBLY FOR USE IN A SILO OR GRANARY

(71) Applicant: FORSBERG VÄXTODLING AB, Örsundsbro (SE)

(72) Inventor: Gustaf Forsberg, Örsundsbro (SE)

(73) Assignee: Forsberg Växtodling AB, Örsundsbro (SE)

( * ) Notice: Subject to any disclaimer, the term of this patent is extended or adjusted under 35 U.S.C. 154(b) by 0 days.

(21) Appl. No.: 16/626,967

(22) PCT Filed: Jun. 26, 2018

(86) PCT No.: PCT/SE2018/050689
§ 371 (c)(1),
(2) Date: Dec. 27, 2019

(87) PCT Pub. No.: WO2019/004912
PCT Pub. Date: Jan. 3, 2019

(65) Prior Publication Data
US 2020/0223649 A1 Jul. 16, 2020

(30) Foreign Application Priority Data

Jun. 30, 2017 (SE) .................................. 1750862-3

(51) Int. Cl.
*B65G 65/48* (2006.01)
*A01F 25/20* (2006.01)
*B65G 47/16* (2006.01)

(52) U.S. Cl.
CPC ...... *B65G 65/4836* (2013.01); *A01F 25/2018* (2013.01); *B65G 47/16* (2013.01);
(Continued)

(58) Field of Classification Search
CPC ................ B65G 65/4836; B65G 47/16; B65G 65/4845; B65G 65/46; B65G 65/4809;
(Continued)

(56) References Cited

U.S. PATENT DOCUMENTS 2,790,563 A 4/1957 McCarthy
3,151,749 A * 10/1964 Long .................... B65G 65/466
414/310
(Continued)

FOREIGN PATENT DOCUMENTS

| CA | 1210920 A | 9/1986 |
| CA | 2503906 A1 | 10/2006 |
| DE | 3224491 A1 | 1/1984 |
| EP | 1086913 A1 | 3/2001 |
| FR | 2693710 A1 | 1/1994 |

*Primary Examiner* — James R Bidwell
(74) *Attorney, Agent, or Firm* — Dilworth & Barrese, LLP

(57) ABSTRACT

A sweep conveyor assembly is provided for use in a silo or granary (70) having a floor (71), a generally cylindrical wall (72) upstanding from the floor (71) and a discharge apparatus (1) for discharging material (74) from a centre of the floor (71) to an exterior location. The sweep conveyor assembly has a sweep conveyor (S) for transporting material (74) inside the silo (S) or granary towards the centre of the floor (71) where it can be discharged by the discharge apparatus (1), a holder (H), and a link mechanism (8) for connecting the sweep conveyor (S) to the holder (H), and in turn having a connection link (L) with a first end (83) and a second end (84). The first end (83) is connected to the holder (H) at a fixed pivot point and the sweep conveyor (S) is connected to the second end (84) of the connection link (L) at a movable pivot point. The connection link (L) rotates about the fixed pivot point, forming a first angle (α) between the connection link (L) and the holder (H), and the sweep conveyor (S) rotates about the movable pivot point, forming a second angle (β) between the sweep conveyor (S) and the connection link (L). The link mechanism (8) controls a ratio (Continued)

Figure 1:
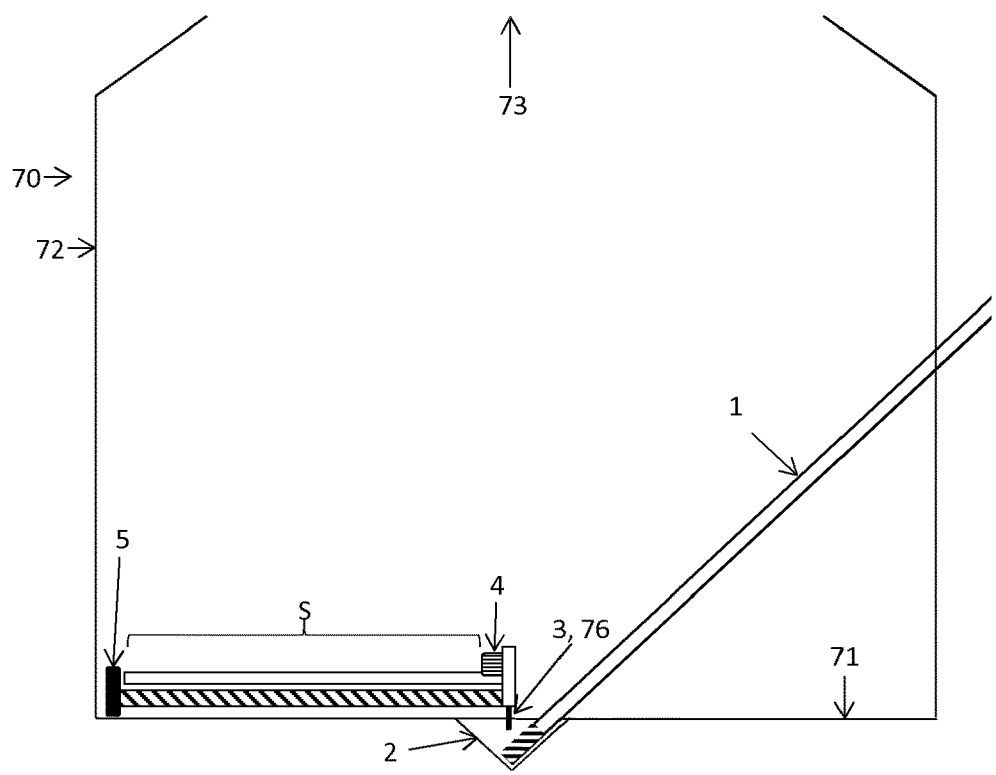

between the first angle (α) and the second angle (β), with a magnitude of the first angle (α) and second angle (β) controlled by an angular position of the sweep conveyor (S).

19 Claims, 15 Drawing Sheets

(52) U.S. Cl.
CPC .... *B65G 65/4845* (2013.01); *B65G 2201/042* (2013.01); *B65G 2814/0223* (2013.01)

(58) Field of Classification Search
CPC ...... B65G 2814/0223; B65G 2201/042; A01F 25/2018
USPC .......................... 198/666; 414/312, 318, 319
See application file for complete search history.

(56) References Cited

U.S. PATENT DOCUMENTS

| | | | |
|---|---|---|---|
| 3,519,152 A | 7/1970 | Broberg | |
| 4,619,577 A | 10/1986 | Swanson | |
| 4,669,941 A | 6/1987 | West et al. | |
| 5,167,542 A * | 12/1992 | Haitmanek | H01R 13/6456 |
| | | | 439/681 |
| 7,967,542 B2 * | 6/2011 | Epp | B65G 65/466 |
| | | | 414/311 |
| 8,864,433 B2 | 10/2014 | Hoogestraat et al. | |
| 9,809,402 B2 * | 11/2017 | Nelson | B65G 65/425 |
| 9,902,575 B1 * | 2/2018 | Mack | B65G 65/4836 |
| 2004/0213650 A1 | 10/2004 | Epp et al. | |
| 2016/0096695 A1 | 4/2016 | Nelson et al. | |

* cited by examiner

US 10,934,109 B2

SWEEP CONVEYOR ASSEMBLY FOR USE IN A SILO OR GRANARY

TECHNICAL FIELD

The present invention relates to a sweep conveyor or sweep auger, assembly for use in a silo or granary, having a floor, and a generally cylindrical wall, upstanding from the floor and a discharge apparatus, for discharging material, from a centre of the floor to an exterior location, the sweep conveyor, assembly comprising:
- a sweep conveyor, for transport of material, inside the silo or granary, towards the centre of the floor, where it can be discharged by the discharge apparatus,
- a holder,
- a link mechanism for connecting the sweep conveyor to the holder, said link mechanism comprising a connection link having a first end and a second end.

BACKGROUND

The invention relates to a silo, for storage of bulk material, for example grain, where the unloading of the silo is made with a diagonally standing discharge apparatus, for example a screw conveyor, standing diagonally from the bottom centre of the silo, out through the silo wall higher up, in combination with a sweep auger or sweep conveyor, that brings material, in to the center. The fact that the diagonal evacuation screw conveyor consists an obstacle in the silo for the movement of the sweep conveyor, results in that the sweep conveyor cannot reach a whole tour around the inside of the silo, and thus a lot of material remains that has to be removed manually. This invention proposes a main solution to this.

A flat-bottom silo, for grain and other bulk material, is unloaded in two steps:

The major part of the volume is emptied via gravity transport down to a cone in the centre of the silo floor. From the bottom of the cone, the material is evacuated from the silo by a screw or other kind of conveyor. When the silo is evacuated in this way, the evacuation will eventually cease as all the material above the angle of rest from the centre cone is evacuated and no more material can fall down via gravity to the cone.

When the evacuation has stopped due to the above, usually a sweep conveyor, or a sweep auger is used to move the material on the floor in to the central bottom cone. This sweep conveyor is placed radially, with a fixed rotation point in the centre of the silo, and the other end walking around the inside of the silo wall, driven by a wheel, to successively move segment by segment of the material into the centre and the bottom cone.

A number of problems are associated with the unloading of the silo.

Devices for evacuation of the silos, that are built under the silo floor of the flat bottom silos leave a free space on top of the floor for the sweep conveyor, S, to rotate a complete round, and thus evacuate the remaining quantity of the stored material. This solution is expensive for certain kinds of use, for example when storing grain on farms. In order to reduce the investment, often a screw conveyor, standing diagonally at the bottom of the cone, is used instead, leading the material out through the silo wall. This allows to put the grain directly onto the bed of a truck for further transport. However, this fixed mounted, diagonally standing, screw conveyor is in the way for the movement of the sweep conveyor, and does not allow the sweep conveyor, to turn a complete 360 degrees round around the inside of the silo. Up to approx. ¼ of the material, left on the floor after step 1 above, can still be left after the sweep conveyor has completed its maximum portion of its circle. The remaining material has to be removed manually, which is very labour demanding as this can be 10-15 metric tons or more in large silos.

An attempt to solve the problem above is to use a pivoting mounting point, 11, of the sweep conveyor, S, as described by U.S. Pat. No. 4,669,941 and Canadian Patent No. 1 210 920.

Another problem is that the sweep conveyor, when placed on the floor of the silo, is still covered with material, when the central diagonal screw conveyor has emptied all the material that it can bring out by itself. Many types of sweep conveyors cannot start when they are covered with material. This can be handled in two possible ways: Either the sweep conveyor is uncovered by manually removing the material, or, a type of sweep auger or conveyor is used that is portable, that is not entered into the silo until it is the moment to start using it, after the maximum quantity of material has been removed with only the gravity transport, as described above. Both ways are very laborious and can be risky from a labour safety point of view.

There is therefore clearly a need for an improved sweep conveyor, S, assembly that overcomes the problems above.

SUMMARY OF THE INVENTION

The object of the present invention is to eliminate or at least to minimize the problems mentioned above. This is achieved through a sweep conveyor assembly according to the description herein.

According to the invention, the link mechanism is arranged to control a relation between the first angle and the second angle, and a magnitude of the first angle and second angle is controlled by an angular position of the sweep conveyor. Due to the configuration of the connection link and link mechanism, and the ability to control the first and second angle, the operation of the sweep conveyor is considerably improved, facilitating the removal of material from the silo and the efficiency of the process of emptying the silo.

According to an aspect of the invention, the first angle is a function of the second angle. Both these angles are directly determined as a function of the progress of the sweep conveyor along the inside of the silo wall. Thereby, the movement of the sweep conveyor is further improved and the risk of problems during operations minimized. Preferably, the first angle is equal to the second angle.

According to another aspect of the invention, the holder is mounted on the floor of the silo or granary, or on the discharge apparatus. Thereby, the sweep conveyor is held securely and the presence of additional structures inside the silo can be avoided.

According to a further aspect of the invention, the connection link and the link mechanism are permanently connected to the holder, and/or the sweep conveyor is detachably mounted on the link mechanism. Thereby, the link mechanism is held stably whereas the sweep conveyor can be removed, facilitating repairs and maintenance.

According to another aspect of the invention, the link mechanism comprises an additional second link, attached at its first end through a joint at a fixed pivot point at a position on the holder different from the fixed pivot point of the connection link, and having its second end attached to the sweep conveyor through a joint at a movable pivot point, at another position compared to the one where the connection link is attached to the sweep conveyor. Thereby, the control of the first and second angles can be achieved in a convenient and reliable way, and the link mechanism and its movements are rendered sturdy and reliable.

According to another aspect of the invention, the link mechanism comprises at least two wheels arranged in rolling interaction with each other, wherein the connection link is formed/located between a center of rotation of two of the wheels, and wherein the wheels are preferably cog wheels. Thereby, the control of the first and second angles can be achieved in a convenient and reliable way, and the link mechanism and its movements are rendered sturdy and reliable.

According to another aspect of the invention, the link mechanism comprises two wheels which are not touching each other, wherein the connection link is formed between a center of rotation of two of the wheels, and where the wheels are connected by a wire or chain or belt. Thereby, the control of the first and second angles can be achieved in a convenient and reliable way, and the link mechanism and its movements are rendered sturdy and reliable.

According to a further aspect of the invention, the link mechanism comprises a hydraulic or pneumatic or electric actuator between the first end and the second end, wherein the connection link is located between the joints at the fixed pivot point and the movable pivot point. Thereby, another sturdy and convenient of realizing the invention is achieved, giving an excellent control over the first and second angles.

According to another aspect of the invention, the sweep conveyor is connected to the connection link via a vertical connection or adapter, in such a way that the sweep conveyor is beneath the connection link during operation. Thereby, the centre of the silo at floor level can be kept clear of the connection link, link mechanism and holder and thereby facilitate the flow of and removal of material from the silo. Furthermore, the risk of damages to the link mechanism and the driving gear from the motor drive of the sweep conveyor, and other components, due to interference with the material in the silo, can be kept low.

According to a further aspect of the invention, the connection link comprises a joint in the middle so that the second end of the connection link can pivot in relation to the first end of the connection link, forming a third angle between said second and first ends of the connection link. Thereby, material directly beneath the fixed pivot point conveyor can also be reached and removed by the sweep conveyor.

According to another aspect of the invention, the connection link comprises a joint in the middle so that the second end of the connection link can pivot in relation to the first end of the connection link, forming a third angle between said second and first ends of the connection link, and where the sweep conveyor comprises a first and a second conveyor portion that are connected to each other by a sweep conveyor joint, the first conveyor portion being configured to be connected to, and thus following the same movements, as the second end of the connection link that is pivotable in relation to the first end of the connection link. Thereby, the removal of material can be made even more efficient and the flow down into the bottom cone is improved.

According to a further aspect of the invention, the sweep conveyor is essentially horizontal when mounted on the link mechanism, but one end portion of the sweep conveyor extends upwards at a fourth angle from the horizontal direction, said end portion being at the end configured to be connected to the link mechanism. Thereby, removal of material at the centre of the silo can be facilitated in cases when the bottom cone has a small diameter, or in case there is no bottom cone.

According to another aspect of the invention, the sweep conveyor is arranged to allow pivoting upwards about a movable pivot point and to be attached to a conveyor holder provided on or beside the discharge apparatus or standing on supports on the floor or being attached to the silo wall, or a combination of these. Thereby, the start of the operation of the sweep conveyor is facilitated and the risk of damages due to pressure from material on top of the sweep conveyor eliminated.

Many other benefits and advantages of the invention will become readily apparent to the person skilled in the art in view of the detailed description below.

DRAWINGS

Figure 2:
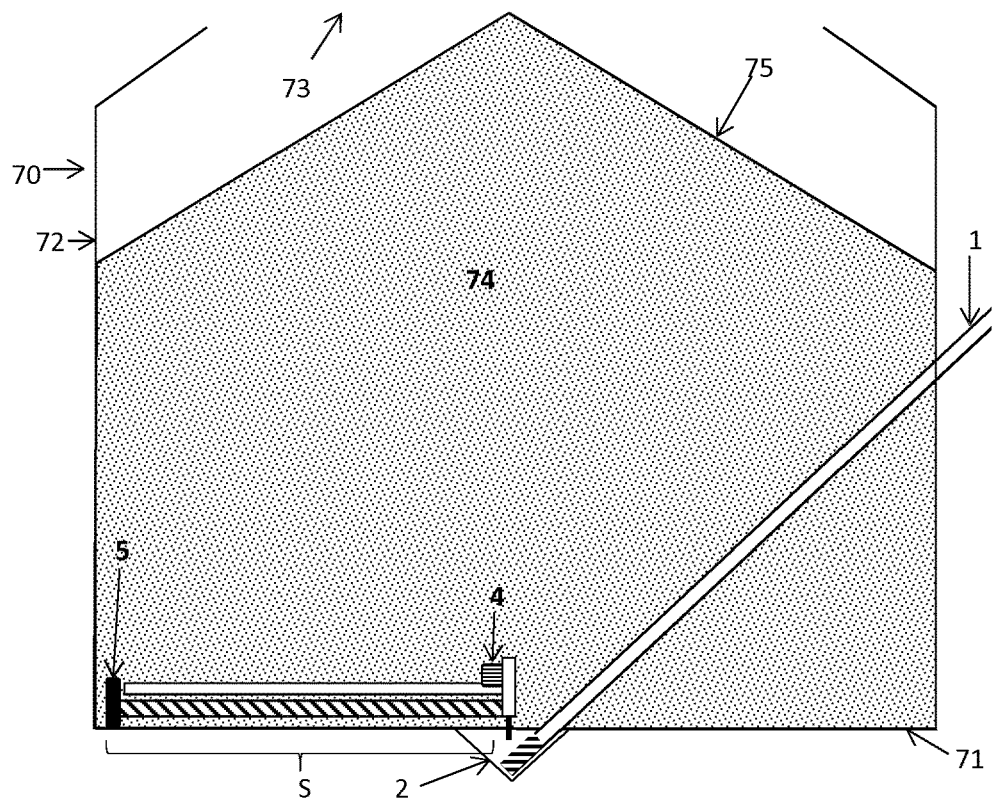
Figure 3:
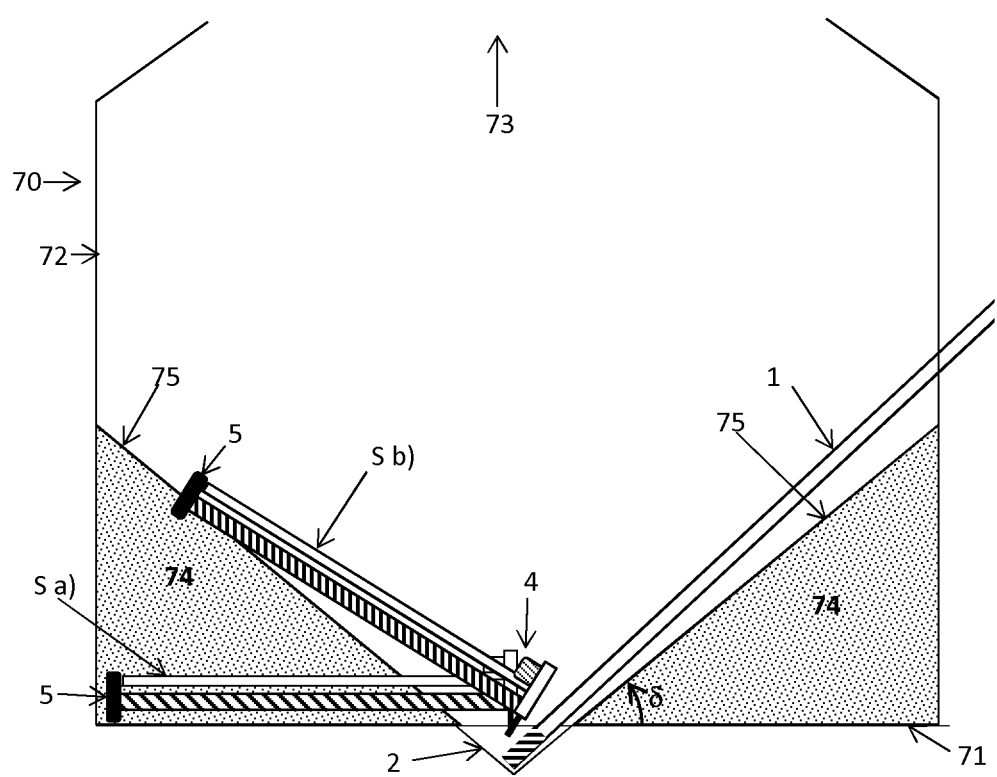
Figure 4:
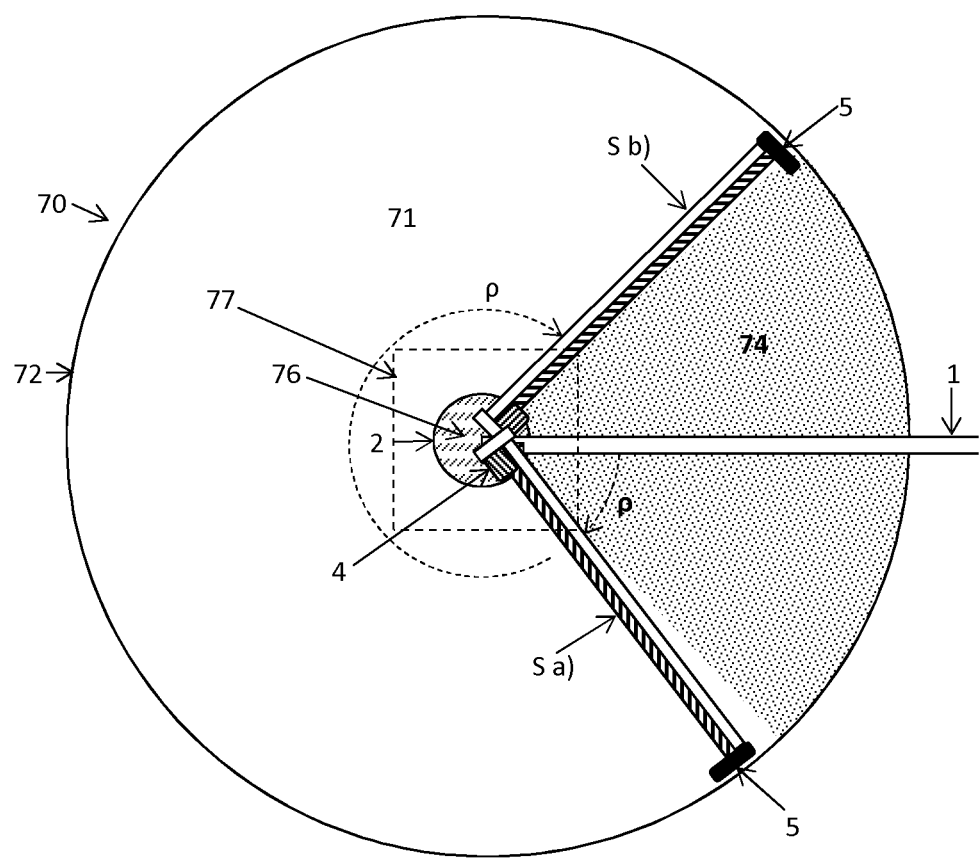
Figure 5:
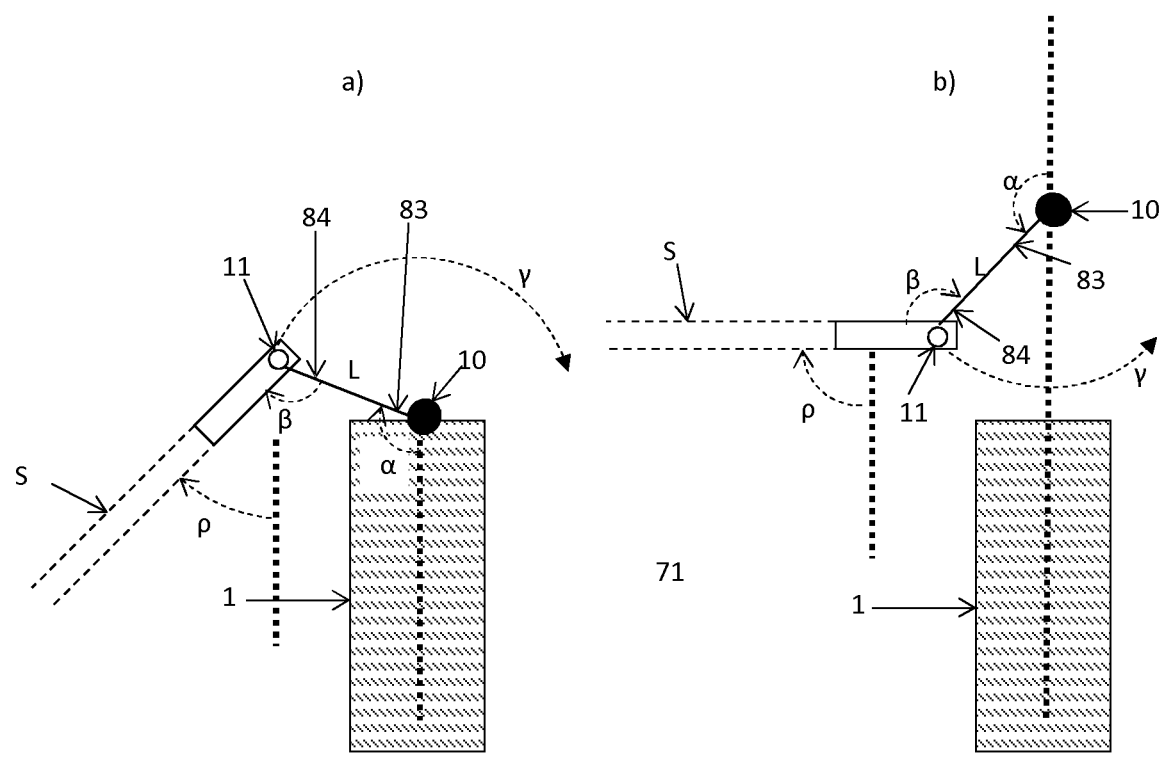
Figure 6:
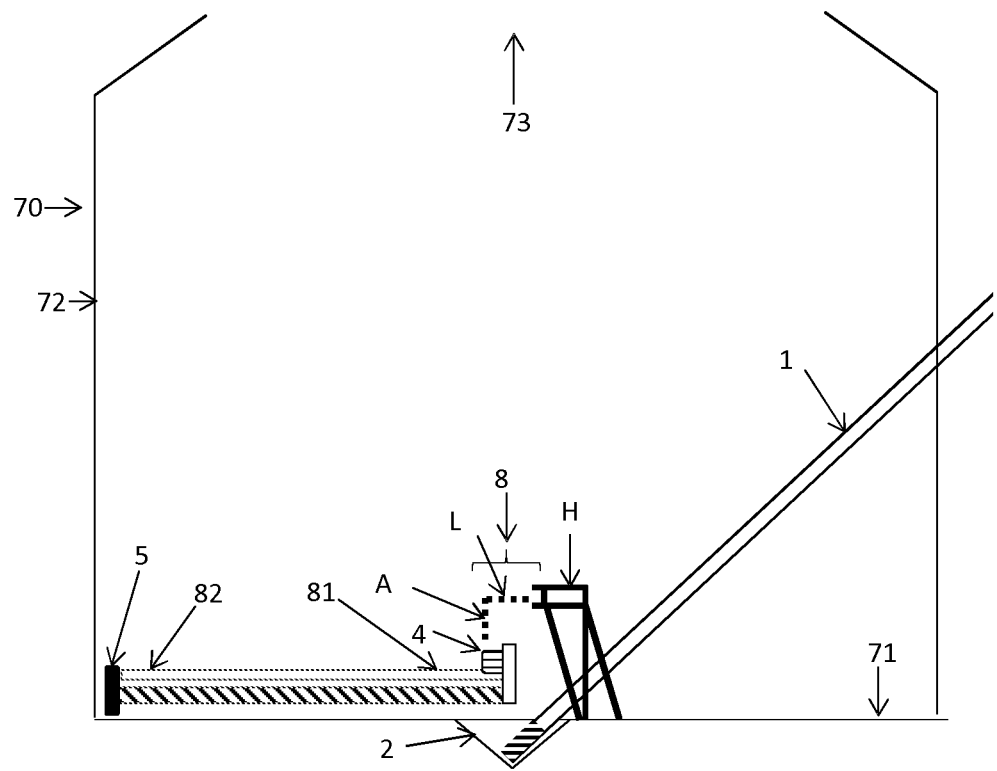
Figure 7:
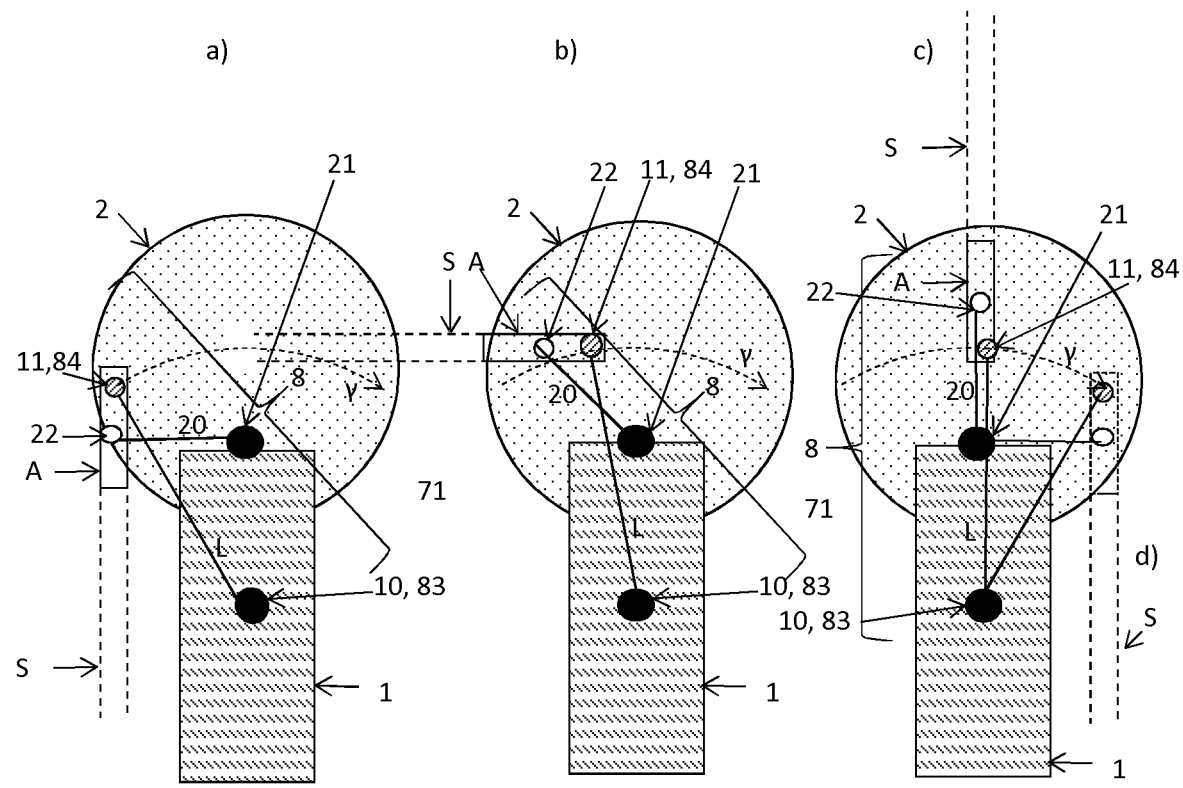
Figure 8:
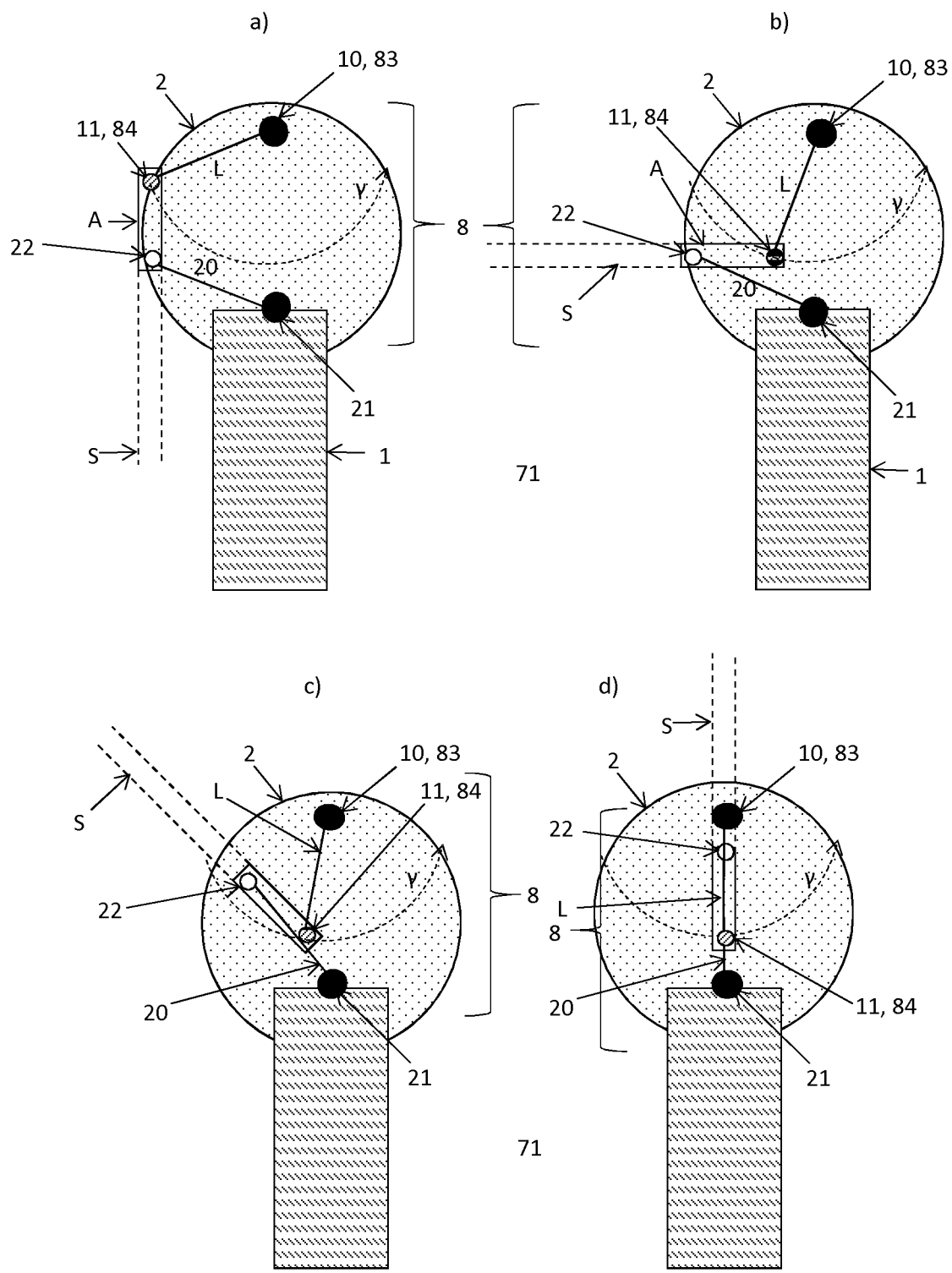
Figure 9:
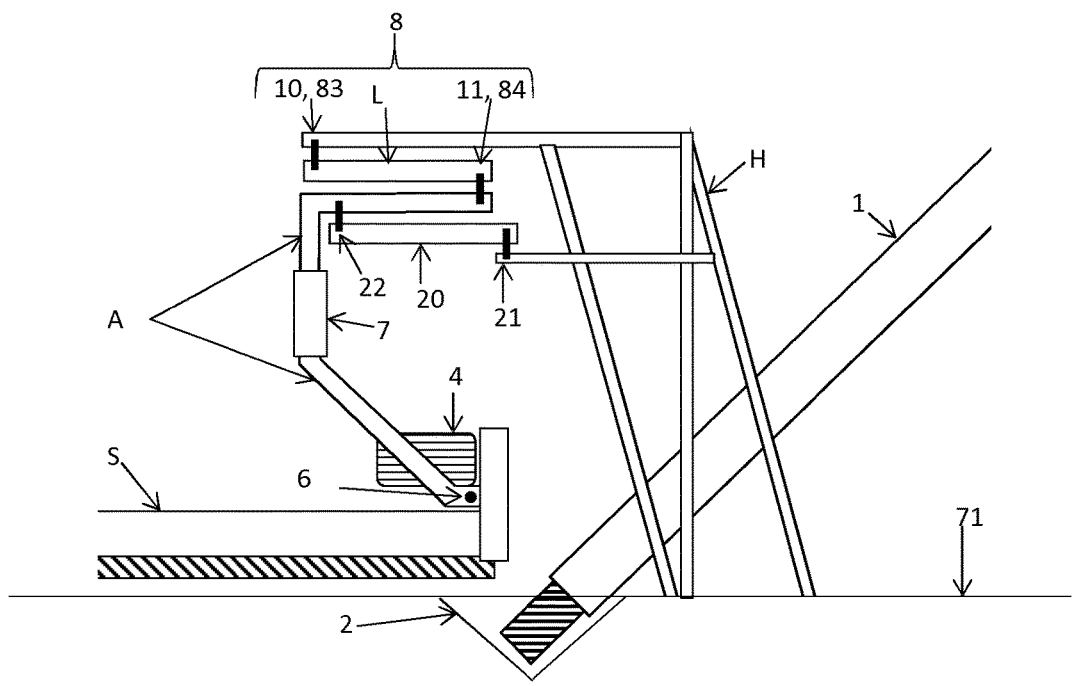
Figure 10:
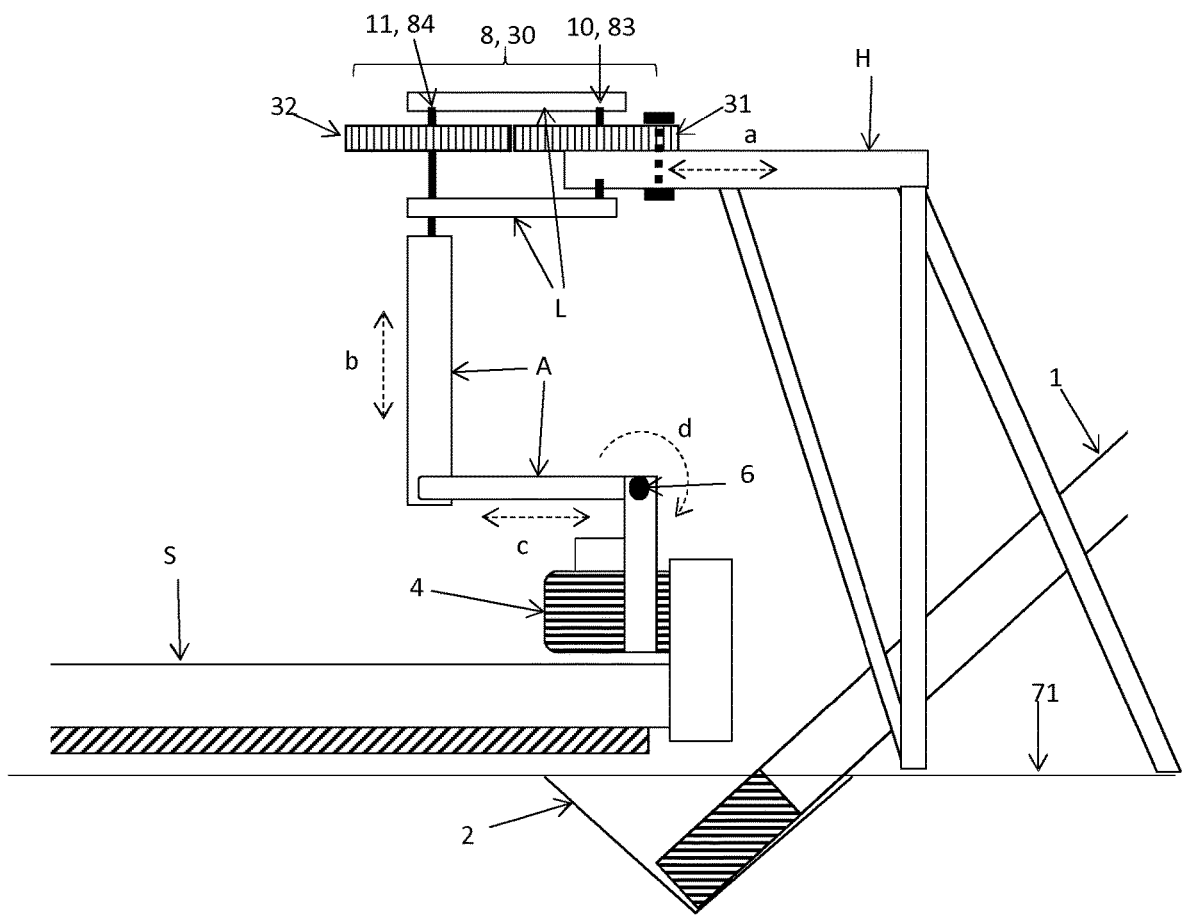
Figure 11:
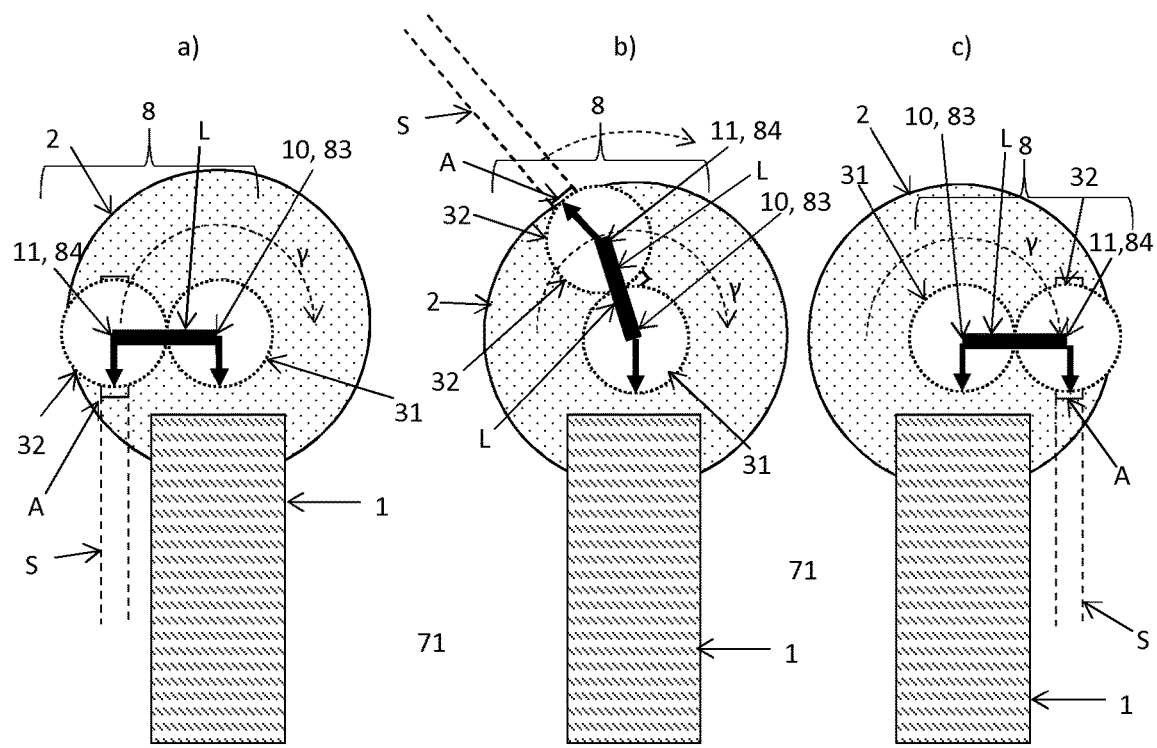
Figure 12:
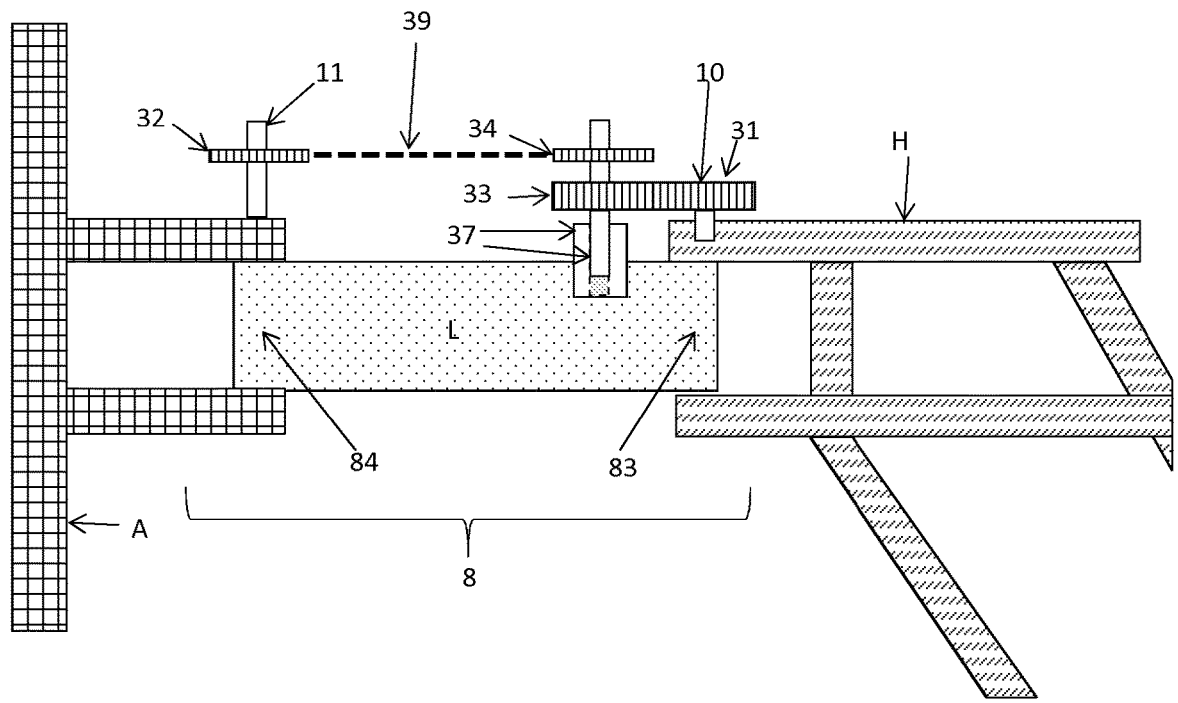
Figure 13:
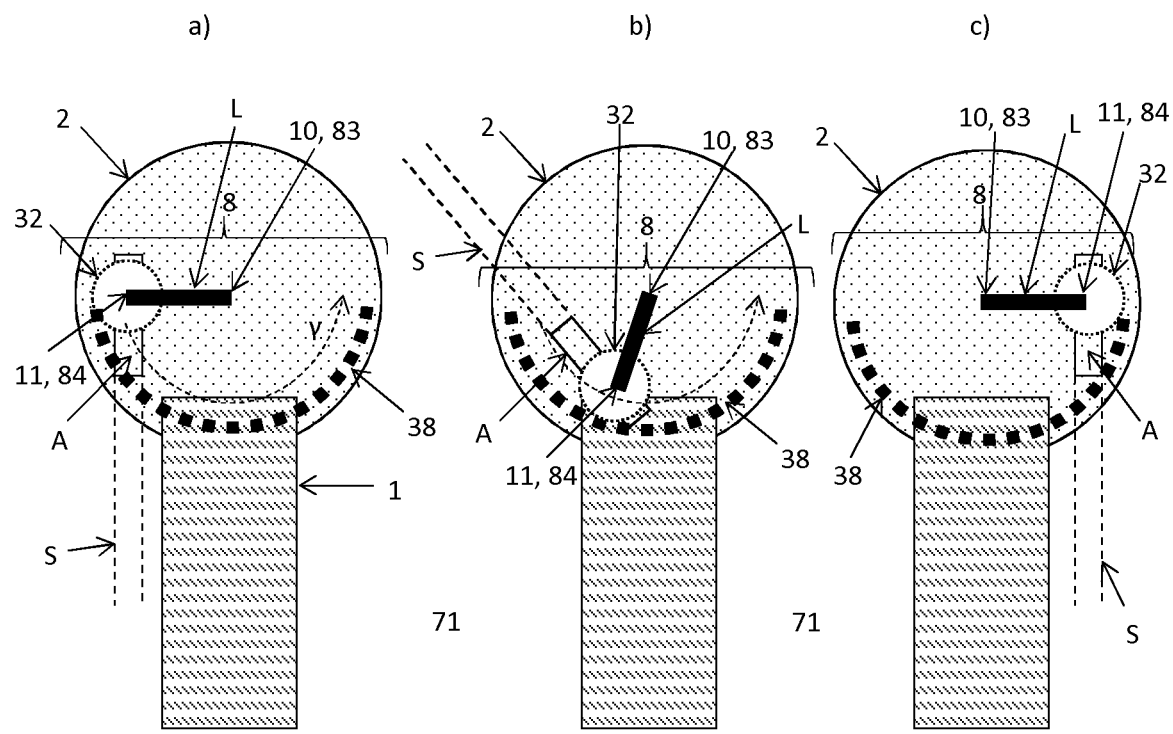
Figure 14:
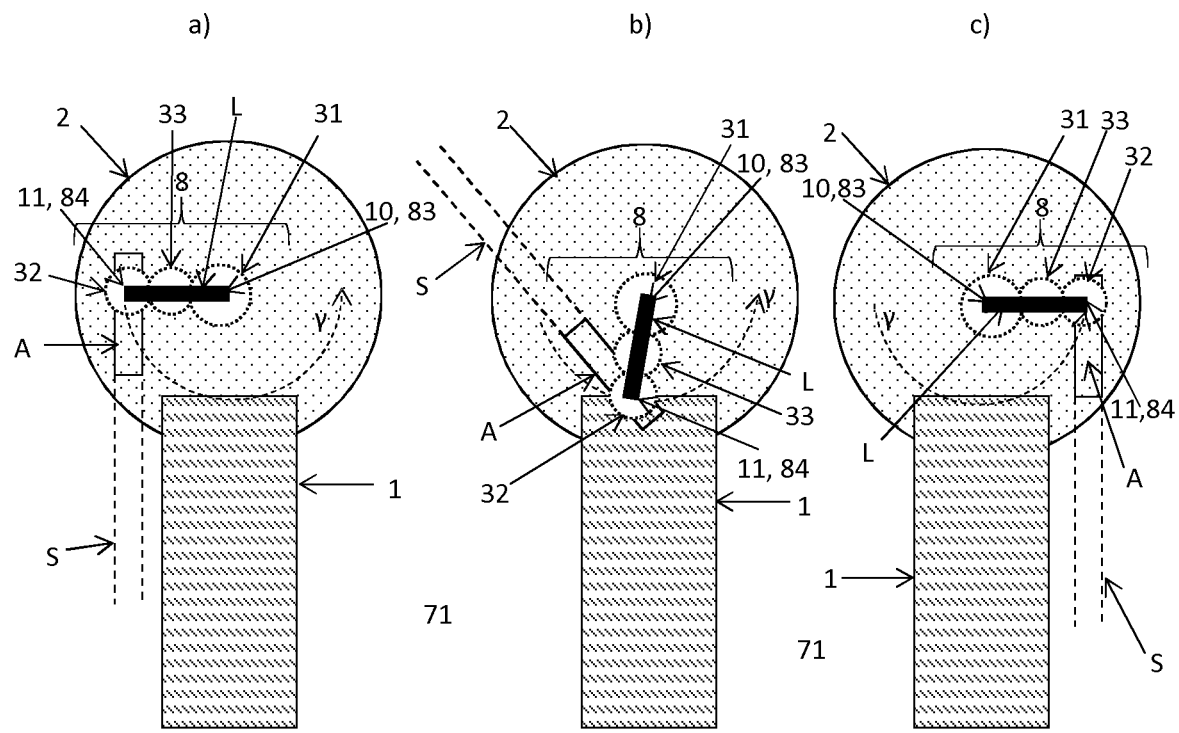
Figure 15:
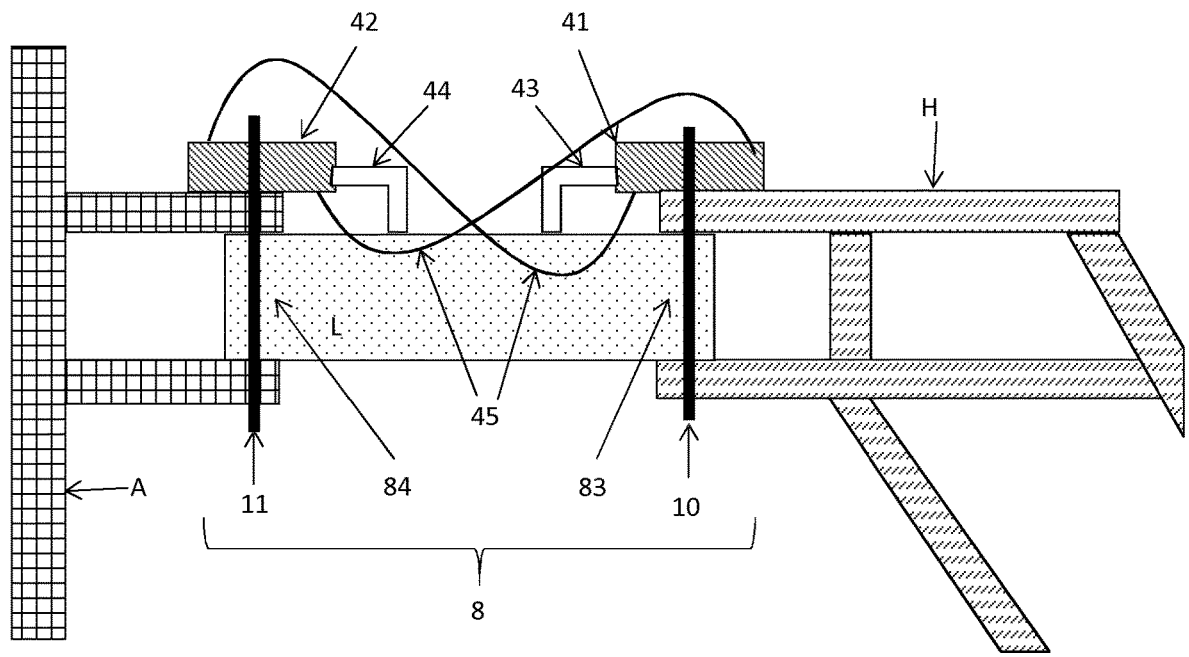
Figure 16:
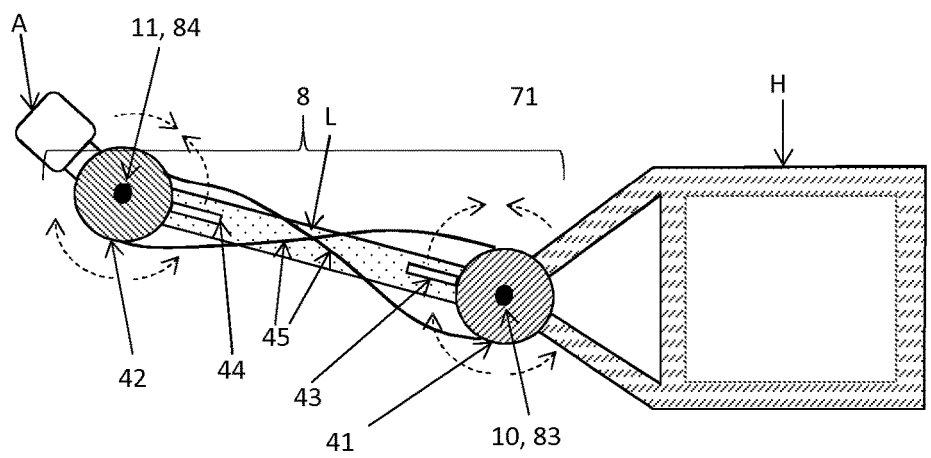
Figure 17:
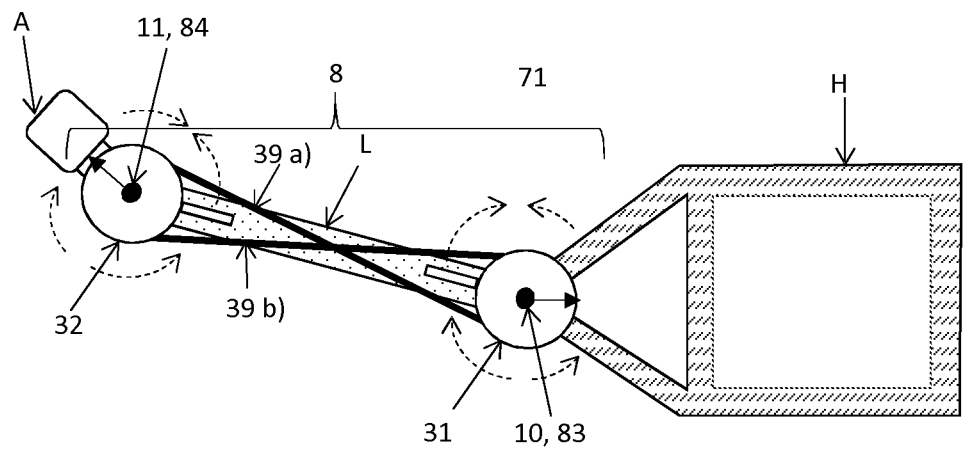
Figure 18:
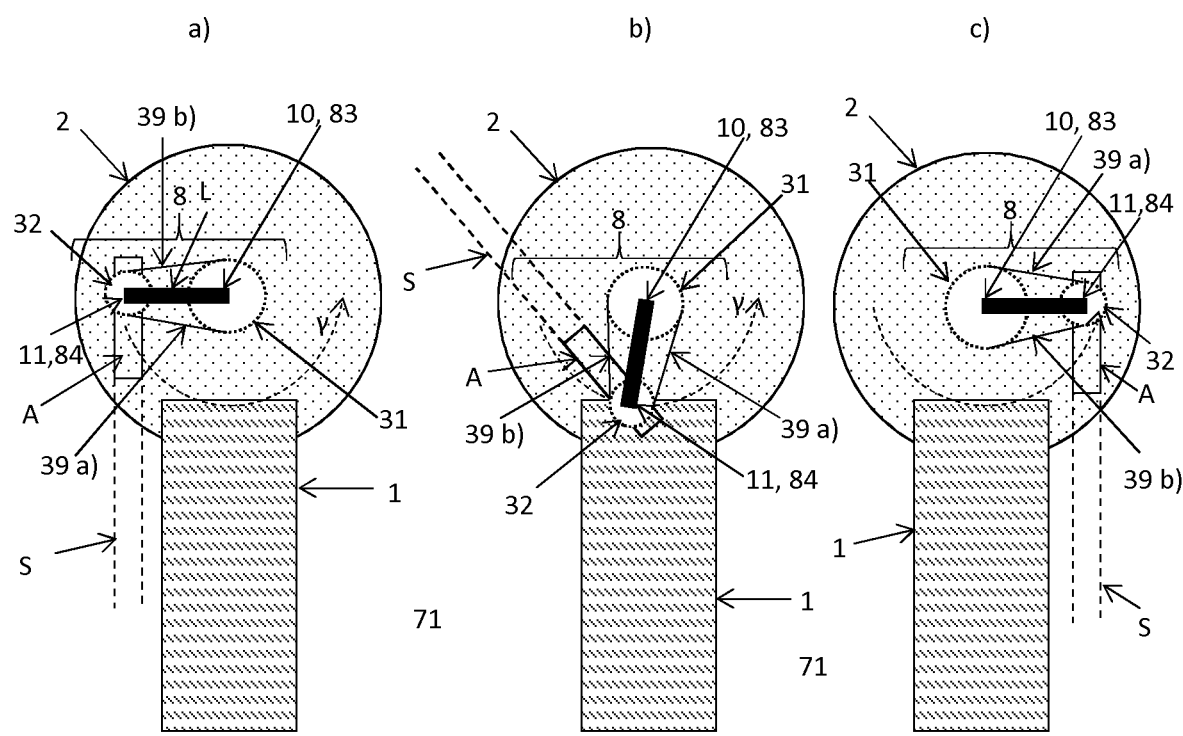
Figure 19:
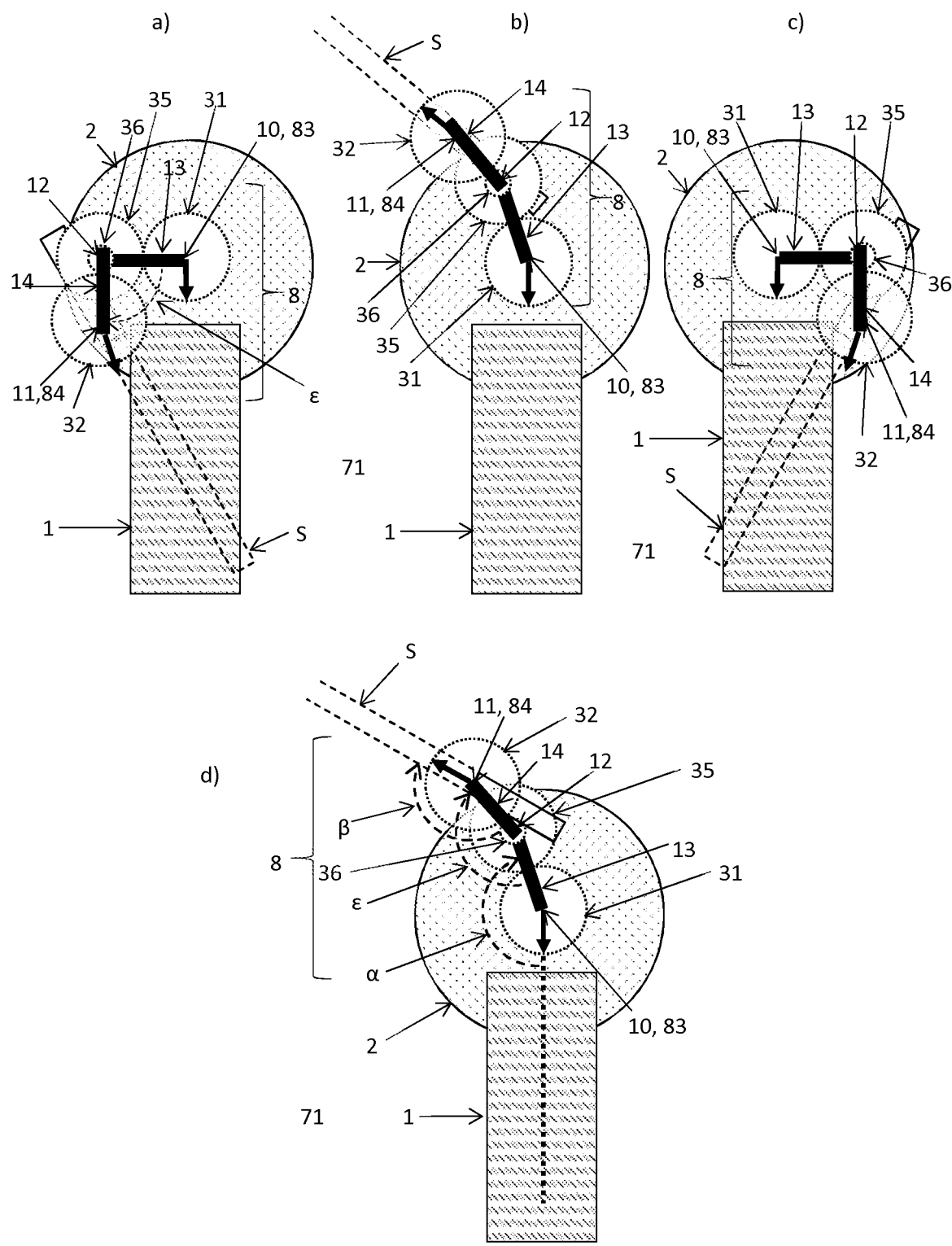
Figure 20:
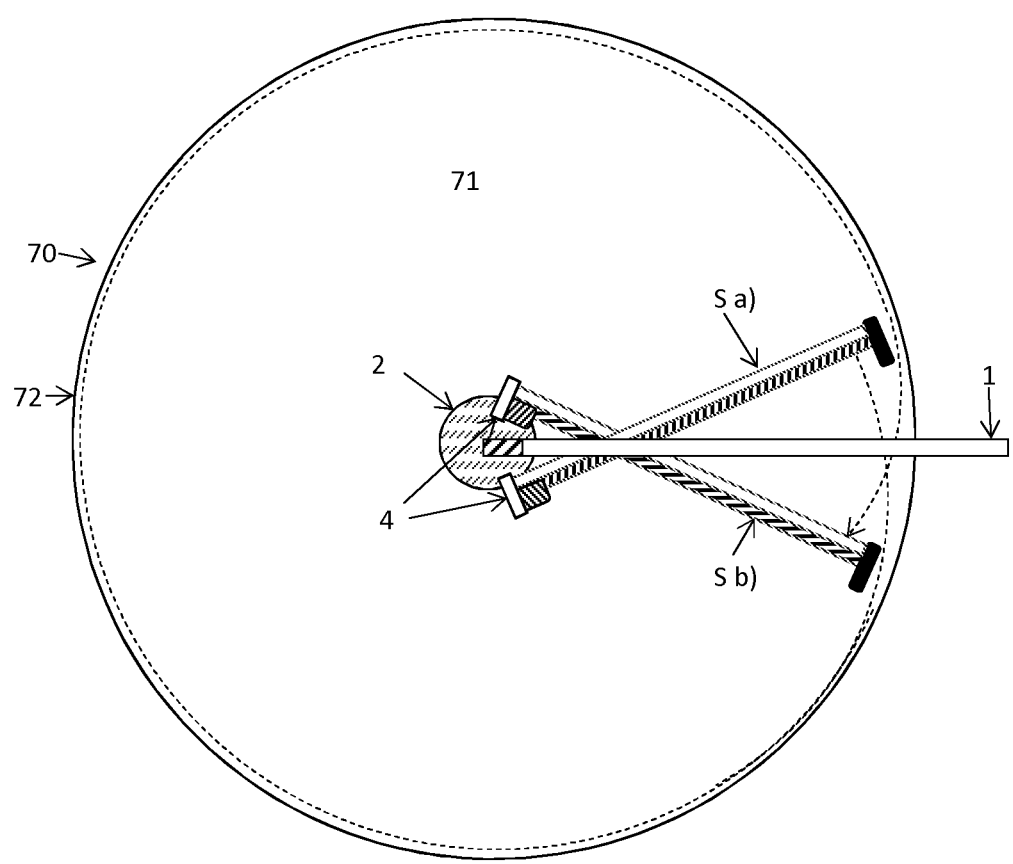
Figure 21:
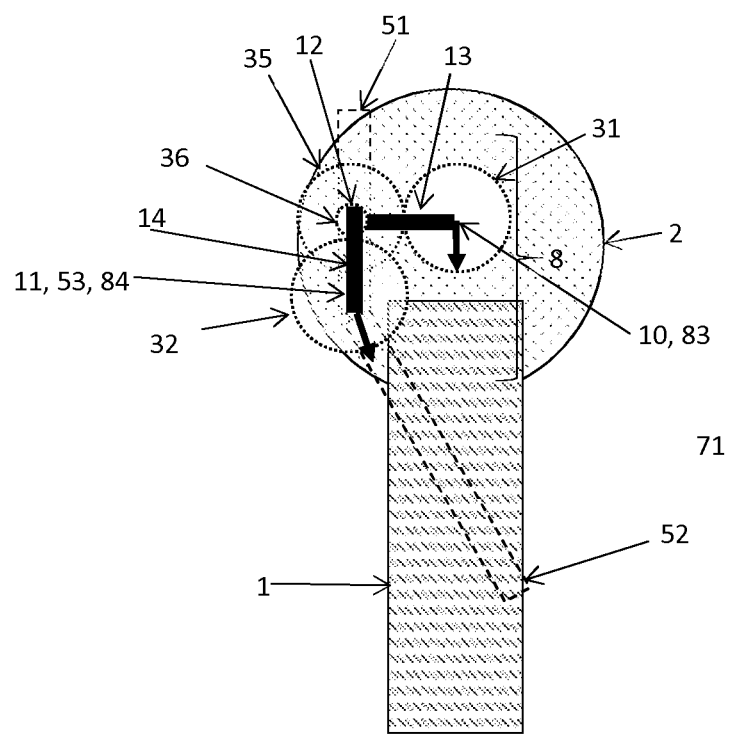
Figure 22:
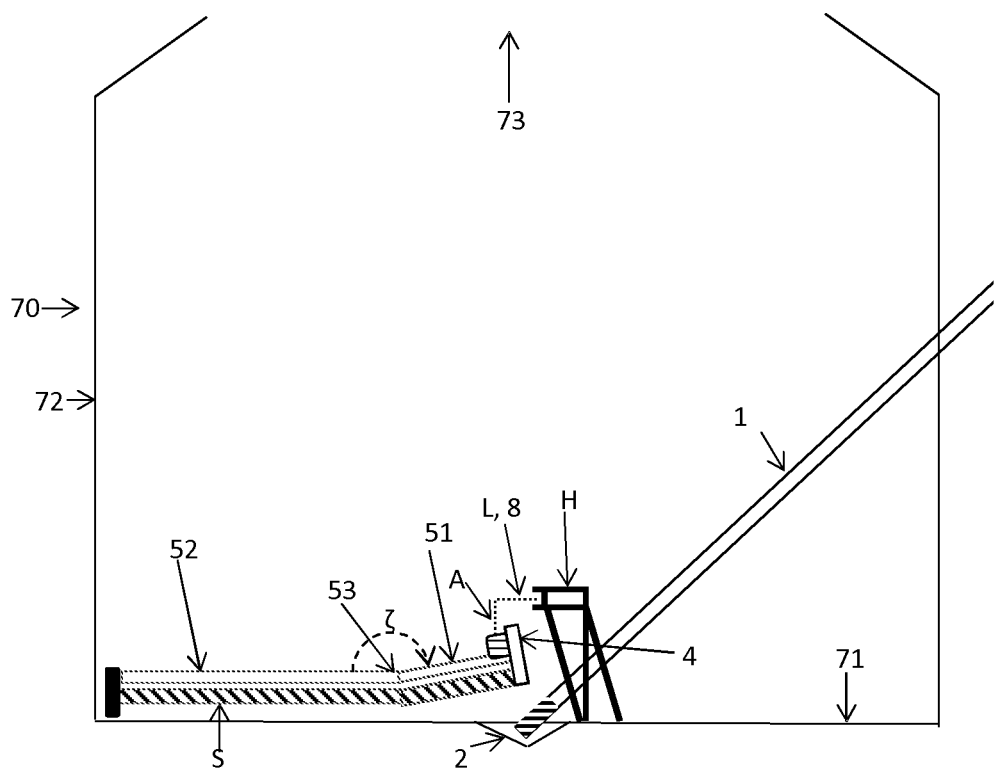
Figure 23:
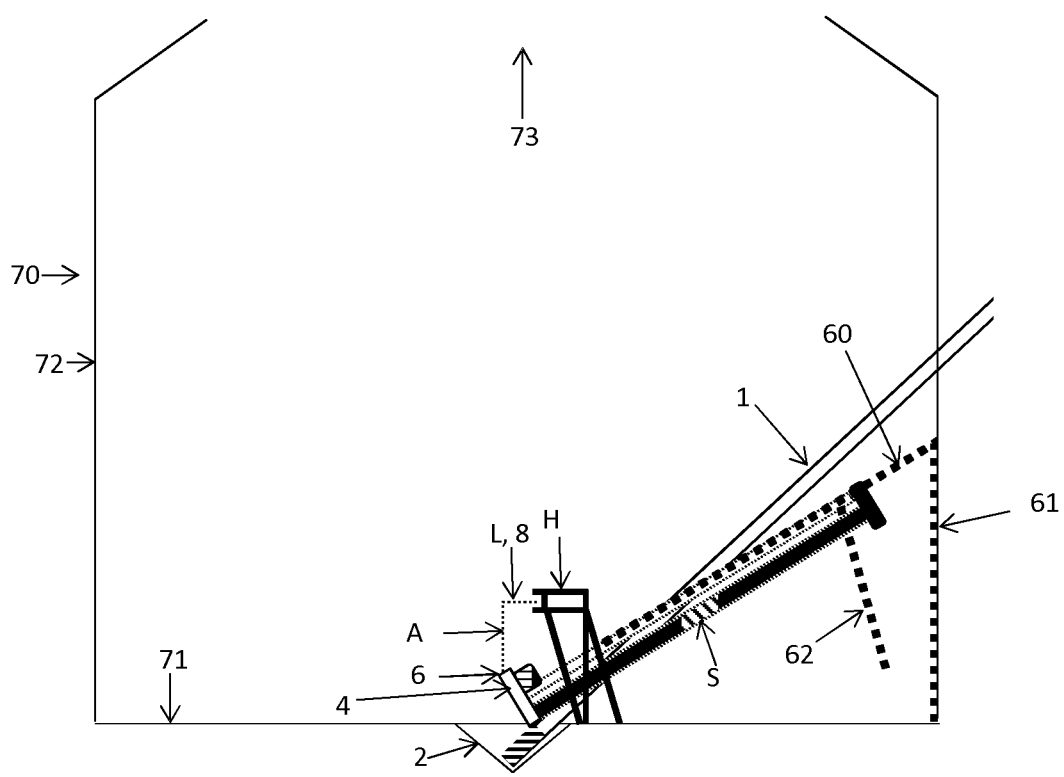

The invention will now be described in more detail with reference to the appended drawings, wherein FIG. 1 discloses a planar view from the side of a silo having a sweep conveyor assembly according to the prior art;

FIG. 2 discloses a planar view from the side of a silo, having a sweep conveyor assembly according to the prior art, where a major part of the silo is filled with the stored bulk material;

FIG. 3 discloses a planar view from the side of a silo, having a sweep conveyor assembly according to the prior art, where the maximum quantity of stored material, has been removed by gravity transport, and showing two optional starting angles for the sweep conveyor;

FIG. 4 discloses a planar view from above of a silo, having a sweep conveyor assembly according to the prior art), indicating possible start- and end-positions of the sweep conveyor and its complete reach in between, with this assembly;

FIG. 5 discloses two optional planar views from above of a sweep conveyor assembly according to the invention, with a link installation and indicating the two angles that are controlled by the present invention;

FIG. 6 discloses a planar view from the side of a silo having a sweep conveyor assembly according to the invention, where the sweep conveyor is mounted to a link mechanism which is installed on a holder;

FIG. 7 discloses a planar view from above of four different positions of a sweep conveyor assembly according to the invention, with a link mechanism installation and an additional second link controlling the angles of the joints of the connection link;

FIG. 8 discloses a planar view from above of four different positions of another sweep conveyor assembly according to the invention, with link mechanism and an additional second link controlling the angles of the joints of the connection link;

FIG. 9 discloses a planar view from the side of a sweep conveyor assembly according to the invention, with a link mechanism and an additional second link controlling the angles of the joints of the connection link;

FIG. 10 discloses a planar view from the side of a sweep conveyor assembly according to the invention, with a link mechanism with two connected wheels or cogwheels, controlling the angles of the joints of the connection link;

FIG. 11 discloses a planar view from above of three different positions of a sweep conveyor assembly according to the invention, with a link mechanism with two connected wheels or cogwheels, controlling the angles of the joints of the connection link;

FIG. 12 discloses a planar view from the side of a detail of a sweep conveyor assembly according to the invention, showing a link mechanism with two connected wheels or cogwheels, controlling the angles of the joints of the connection link, and an elongation chain, allowing to control the movement of the angles over a distance;

FIG. 13 discloses a planar view from above of three different positions of a sweep conveyor assembly according to the invention, with a link mechanism with one wheel or cogwheel connected to a circular pinion rack that together control the angles of the joints of the connection link;

FIG. 14 discloses a planar view from above of three different positions of a sweep conveyor assembly according to the invention, with a link mechanism with three connected wheels or cogwheels, controlling the angles of the joints of the connection link;

FIG. 15 discloses a planar view from the side of a detail of a sweep conveyor assembly according to the invention, showing a link mechanism of two mutually connected hydraulic or pneumatic actuators controlling the angles of the joints of the connection link;

FIG. 16 discloses a planar view from above of a detail of a sweep conveyor assembly according to the invention, showing a link mechanism with two mutually connected hydraulic or pneumatic actuators controlling the angles of the joints of the connection link;

FIG. 17 discloses a planar view from above of a detail of a sweep conveyor assembly according to the invention, showing a link mechanism with two wheels connected with a chain or a belt or a wire or cable, controlling the angles of the joints of the connection link;

FIG. 18 discloses a planar view above of a detail of another sweep conveyor assembly according to the invention, showing a link mechanism with two wheels, connected with a chain or a belt or a wire or cable, controlling the angles of the joints of the connection link;

FIG. 19 discloses a planar view from above of four different positions of a sweep conveyor assembly according to the invention, with two connected links and four connected wheels or cogwheels, controlling the three angles of the two connected links, of the three joints of the two connected links;

FIG. 20 discloses a planar view from above of a silo having a sweep conveyor assembly according to the invention, with two connected links (not shown in the figure), indicating possible start- and end-positions of the sweep conveyor and its complete reach in between, with this assembly;

FIG. 21 discloses a planar view from above of a sweep conveyor assembly, in its starting position, according to the invention, with two connected links and four connected wheels or cogwheels, controlling the three angles of the three joints of the two connected links, with the additional feature that also the sweep conveyor is divided in two parts, and the parts can be turned differently thanks to the mechanism;

FIG. 22 discloses a planar view from the side of a silo, having a sweep conveyor assembly according to the invention, where the sweep conveyor is mounted to a connection link which is installed on a holder, where the central part of the sweep conveyor is inclined upwards;

FIG. 23 discloses a planar view from the side of a silo having a sweep conveyor assembly according to the invention, where the sweep conveyor is mounted to a connection link which is installed on a holder, and where a holder construction is installed to hold the sweep conveyor in an elevated position inside the silo, when not in use;

DETAILED DESCRIPTION

As used herein, the term sweep conveyor includes all kinds of devices suitable for moving material on a granary floor towards a centre of a silo, such as sweep augers and the like.

The problems underlying the invention will now be described in more detail with reference to FIG. 1-4.

FIG. 1 shows a cross-section of an empty silo 70 (the silo top 73 and the filling conveying equipment are not shown and will not be shown in the following text, but are generally known to the person skilled in the art), with a discharge apparatus 1 in the form of a diagonal evacuation screw conveyor 1 that leads from a central cone 2 at a silo bottom 71, out through a silo wall 72, the sweep conveyor S that is operating on the floor 71, with a fixed central rotation point 3, and motor drive 4 at its central end 81, and traction wheel 5 at the peripheral end 82 of the sweep conveyor, S, close to the silo wall 72. The fixed rotation point 3 is often a vertical rotation axis that is fixed in the silo centre 76, for example in a grid above the central cone 2 or above the lower part of the diagonal evacuation screw conveyor 1.

FIG. 2 shows the silo 70 filled, by introducing material 74 through a silo top 73. The material 74 falls on the floor 71 and successively builds up a pile that fills the silo 70. The details of the diagonal evacuation screw conveyor 1, the sweep conveyor S and the centre cone 2 are explained in FIG. 1. As FIG. 2 shows, both the sweep conveyor S and the diagonal evacuation screw conveyor 1 are covered with material 74 when the silo 70 is filled.

After the major part of the volume is emptied via the cone 2 in the centre of the silo floor 71, as described above, the diagonal evacuation screw conveyor 1 has removed all the material 74 that is possible with only gravity bringing the material 74 to fall down into the centre cone 2, without any additional tools. Material 74 that is located below the specific angle of rest δ of the material 74 is not transported by gravity and is therefore still left immobile in the silo 70. At this stage, illustrated by FIG. 3, the sweep conveyor S is prepared for operation. In case it is permanently installed in the silo 70 (see position a) in the figure), the sweep conveyor S has to first be manually uncovered from material 74, otherwise the motor 4 will not have enough force to drive it. In case the sweep conveyor S is portable, this is the stage when it is carried into the silo 70, and being placed on the top of the slope of the surface 75 of the material 74 left in the silo 70 (see b) in the figure). It will then dig itself to the bottom 71 as soon as it starts to run and move material 74 down to the central cone 2 where the material 74 is immediately evacuated by the diagonal screw conveyor 1.

FIG. 4 illustrates the inside of the silo 70 as seen from above. The dotted rectangle in the middle illustrates the central area 77 of the silo 70 as referred to in several later figures. When the right moment to use the sweep conveyor S has been reached, as described above, the sweep conveyor S is used to transport remaining material 74 into the centre cone 2, while the diagonal evacuation screw conveyor 1 continues to successively evacuate the centre cone 2. When the sweep conveyor S is operating on the floor 71, it is moved forward around the silo floor 71, with its traction wheel 5 following the inside of the silo wall 72. Thereby, successively it pushes itself into the remaining segments of the pile of material 74, thus forcing material 74 from the edge of the pile to be transported into the centre, which makes more space for the sweep conveyor, S, to further move forward into the pile. The movement is illustrated by the dotted arrow in FIG. 4, which also illustrates the angle of progression of the sweep conveyor, ρ. However, the diagonal evacuation screw conveyor 1 is standing in the way for the sweep conveyor S, and thus it does not allow the sweep conveyor to go a full 360 degree round, and a considerable part of the material 74 is left in the silo 70. An example of the maximum reach of the sweep conveyor S is made in FIG. 4, illustrating the start and end positions a) and b) of its reach. The remaining material 74 has to be moved manually, for example by a shovel, to the centre cone 2, while the diagonal evacuation screw conveyor 1 continues to evacuate the material 74 from the cone 2. This means a hard physical work with a bad labour environment, as the diagonal evacuation screw conveyor 1 makes a lot of noise, it is dark and dusty and there is always risks associated with working close to a rotating screw.

The solutions to these problems according to the present invention will now be described with reference to these same figures.

A horizontal connection link L (minimum length is half of the sum of the widths of the sweep conveyor and the evacuation screw conveyor) is mounted at its first end 83 mounted through a first joint 10 with a vertical rotation axis, fixed to a holder H close to the centre of the silo, for example it can be mounted above the lower end of the diagonal evacuation screw conveyor 1. See in FIG. 5 the solution illustrated from above in two figures in a cut-out of the central area 77 of the silo 70, this area being explained by the dotted rectangle in FIG. 4. The FIG. 5 thus illustrates only the area in the middle of the silo 70, so the silo walls are not seen in the figure as they are more distant. In the FIG. 5, the sweep conveyor S is mounted close to the diagonal evacuation screw conveyor 1, with its turning point on a second joint 11 at the second end 84 of the connection link L, as a movable pivot point, so that the second joint 11, connects the sweep conveyor S with the connection link L. The first angle α is determined by an angle between the connection link L and an axis extending along a geometrical centre of the holder, see the straight dotted line in FIG. 5, copied into two parallell positions for illustration of the angles. The first angle α and the second angle β are shown in FIG. 5.

These two angles are continuously mutually dependent thanks to a link mechanism 8. The link mechanism 8 comprises the connection link and a device to control a ratio or relation between the first angle α and the second angle β. The magnitude of these two angles are both determined by the advancing of the sweep conveyor, S, i.e. an angular position of the sweep conveyor S. The change of the angles is driven by the motion of the sweep conveyor, S. ρ is the angle of progression of the sweep conveyor. The circular pathway of the second joint 11 at the movable pivot point of the sweep conveyor S, is shown with a dotted arrow γ, illustrating how the second joint 11 at the movable pivot point of the sweep conveyor S is moved sideways to increase the reach of the sweep conveyor S. In this way, γ also illustrates the change of the first angle α of the connection link L as it moves sideways. For simplification, the central cone 2, in the floor 71, is not shown, but it is below the space over which the link L is turning. Two alternative examples of movements of the connection link L and the sweep conveyor S are shown in FIG. 5: a) and b) show pivoting in two different directions. In a) the turning motion is away from the diagonal evacuation screw conveyor 1, so that the rotation of the connection link L is in the same direction as the sweep conveyor S (that we here call "straight circular movement"), in b) it is towards the diagonal evacuation screw conveyor 1, so in the reversed rotation direction compared to the sweep conveyor S (that we here call "reversed circular movement"). The first and second angles α and β are fully mutually dependent by different optional mechanisms, and their values are determined by the progression of the sweep conveyor S.

Thus, the link mechanism 8 controls the pivoting of the link L in relation to the holder H and the angle between the link L and an axis along a geometrical centre of the holder H as shown in FIG. 5 as the first angle α. Simultaneously, the link mechanism 8 control the pivoting of the sweep conveyor S in relation to the link L and the angle between the sweep conveyor S and the link L is the second angle β. By using a control in the link mechanism 8 as described below with four types of controls A, B, C or D, the first and second angles α, β are controlled and they are preferably controlled as the first angle α being a function of the second angle β This means that the control A, B, C or D uses a value of the first angle α and pivots the link L and sweep conveyor S so that the second angle β is of a magnitude that can be determined as a function of the first angle α. For instance, the second angle β can be held at the same magnitude as the first angle α so that α=β. As the first angle α changes, the second angle β will also change correspondingly. As another example, the second angle β can be twice the first angle α so that β=2α. As the second angle β changes when the sweep conveyor S is pivoted the first angle α will change at half the rate of the second angle β. How the control of the link mechanism 8 is realized is described below with reference to the embodiments of the invention.

The link mechanisms 8 to control the first and second angles α, β are of the following types, described herein as embodiments of the present invention A: With a an additional, second link, 20

B: With wheels, for example cogwheels, 31, 32, 33, 34, 35, 36

C: Hydraulic, pneumatic or electric actuators, 41 and 42

D: With a chain, a belt or a wire, 39

Each one of these four types can be designed to let the connection link L turn either from or towards the diagonal evacuation screw conveyor 1 (see FIG. 5), however the two options a) and b), respectively, are reversed in relation to each other and the two variants require different gearing, so that in a) the first and second angles both go from for example 90 to 270 degrees (a total move of 180 degrees), whereas in b) a goes from for example [90 to 270] degrees while β goes from for example [270 to −270] degrees (a total move of 540 degrees in the reversed direction). We choose to call the movements a) the straight circular movement (FROM the diagonal evacuation screw conveyor 1) and b) the reversed circular movement (TOWARDS the diagonal evacuation screw conveyor 1). If the length of the connection link L is extended beyond the half of the sum of the widths of the sweep conveyor S, and the diagonal evacuation screw conveyor 1, the mechanism can be made so that the sweep conveyor 1 can turn slightly more than 360 degrees without touching its support, so that it reaches also below the diagonal evacuation screw conveyor 1, which can permit removal of any material 74 remaining right below the evacuation screw conveyor 1. Please note that in all the example figures, the movements go from left to right. However, the opposite movement from right to left is of course possible and completely analoguous with the left-to-right one, but mirrored, and therefore both directions are covered by this invention.

The mechanisms are generally mounted on a holder H, preferably in the form of a frame, above the lower end of the diagonal evacuation screw conveyor 1.

Additional variations on the embodiments described above are:

E: A solution according to A-D with rotating movements simultaneously in three different joints, 10, 11 and 12. The first, second and third angles α, β and ε of the first 10, second 11 and third 12 joints do not necessarily have to be the same. This solution allows the sweep conveyor 1 to turn more than 360 degrees and thus bring also the material 74 that is straight under the diagonal evacuation screw conveyor 1.

F: A solution according to E, but where also the sweep conveyor S itself can bend in the second joint 11, in order to allow the material 74 to arrive as close to the bottom cone 2 as possible, which is an advantage if the cone 2 has a small diameter not allowing enough good evacuation for the solution E.

G: A solution according to any one of the solutions A-F, but where the sweep conveyor S is also bent upwards in a seventh vertical joint 53 close to the centre of the silo 70, in order to improve the evacuation of material 74, in case the bottom cone 2 is shallow or in case there is no bottom cone.

H: A complement to all the above solutions is that a peripheral end 82 of the sweep conveyor S is lifted up and being fixed by a vertical support, 60 and 61, before the silo 70 is being filled with material 74 so that the sweep conveyor S shall not be covered with material 74 but instead it shall be free above the sloping surface 75 of the angle of rest δ of remaining material 74, when the diagonal evacuation screw conveyor 1 has evacuated as much as possible without the use of the sweep conveyor S. This allows to avoid the following two labour intensive alternatives: 1. A portable sweep conveyor S that is carried into and mounted inside the silo 70 at the moment when it is needed, and that has to be carried out again before the silo 70 will be filled again, and 2. A fixed installed sweep conveyor S that gets covered with material 74 on the floor 71, and therefore has to be uncovered manually with a shovel before it can be used.

The proposed solutions to the link mechanism 8 for the embodiments of the present invention are preferably mounted on a holder H (or frame or gantry), preferably placed on the floor 71 standing over the lower, central end of the diagonal evacuation screw conveyor 1 near the centre of the silo 76 and the bottom cone 2, see FIG. 6. In FIG. 6, the dotted lines indicate the approximate positions of the connection link L (horizontal) and the adapter A (vertical) to attach the sweep conveyor S to the connection link L. The connection link L connecting with the sweep conveyor S has its fixed pivot point located at the first joint 10 on the holder H. It is an advantage to arrange the connection of the sweep conveyor S to the holder H in a way so that:

The sweep conveyor S is hanging below the link mechanism 8, so that its installation is not in the way for the movement of the material 74, running from above and into the bottom cone 2 below the sweep conveyor S (which it risks to do if the connection link L is placed under the sweep conveyor S), and so that it does not limit the movement of the sweep conveyor S (which it risks to do if the connection link L is located beside the central end 81 of the sweep conveyor S).

The installation can easily be adapted to the individual geometry of the silo 70, by allowing
  an adjustable distance between the peripheral end 82 of the sweep conveyor S and the silo wall 72
  an adjustable first joint 10 being the fixed pivot point of the connection link L, so that the distance between the central end 81 of the sweep conveyor S and the lower part of the diagonal evacuation screw conveyor 1 can be adjusted
  an adjustable height of the central end 81 of the sweep conveyor S above the bottom cone 2
  See some examples of these adaptable installations in FIGS. 9 and 10.

The adapter A to connect the sweep conveyor S to the connection link L can be adapted with different designs to fit different types of sweep conveyors, and this statement applies to any one of the solutions of this invention. There is no limit in the possible designs of the adapter A, as long as it connects the second end 84 of the connection link L through the second joint 11 to the sweep conveyor S, and allows the sweep conveyor S to pivot around this second joint 11 as a movable pivot point. The adapter A comprises a sixth vertically turnable joint 6, so that the peripheral end 82 of the sweep conveyor S can be lifted up, while the central end 81 is still at the same height as the sixth joint 6. The idea is that the peripheral end 82 can be lifted at least to a height allowing it to run freely above the angle of rest δ of the surface 75 of the material 74, being left in the silo 70, when it is the moment to set the sweep conveyor S into operation (See FIG. 3 option b). See examples in FIGS. 9 and 10.

Examples of these aspects of the installation of the sweep conveyor S and its connection to the holder H will be given in some of the detailed descriptions of the solutions later on in this text, however the same principles will be applicable for all the solutions.

The especially advantageous embodiments A-H will now be described in more detail with reference to the drawings.

A. Solutions with an Additional, Second Link 20 to Control First and Second Angles α and β at the First and the Second Joints 10 and 11 of the Connection Link L An additional second link 20 is connected with a fourth joint 21 and a fifth joint 22 at each one of its two ends, the fourth joint 21 being connected to a fixed pivot point, preferably connected to the holder H, and the fifth joint 22 being connected to the the sweep conveyor S. As the sweep conveyor S moves around along the inner walls 72 of the silo 70, the additional, second link 20, in this embodiment preferably a pivot arm, forces the sweep conveyor to push the connection link L to turn, in a way that the second joint 11 at the movable pivot point of the sweep conveyor S will move sideways and allow the sweep conveyor S to make a complete 360 degrees turn around the silo 70 without being hindered by the diagonal evacuation screw conveyor 1. The solution A1 describes the straight circular movement, see FIG. 7, and A2 describes the reversed circular movement, see FIG. 8. FIG. 9 shows an example of how the solution A2 can look like as seen from the side.

FIG. 7 Illustrates the solution A1 with an additional, second link 20 controlling the movement of the connection link L, as seen from above, for the straight circular movement option. The figure illustrates only central area 77 in the middle of the silo 70, so the silo wall 72 is not seen in the figure as it is more distant. In order to simplify the figure, the holder that holds the installation has not been drawn however it can still be present. In FIG. 7, the illustrations show different positions of the connection link L and the sweep conveyor S: a) shows the starting position, b) shows a position after one quarter of a full tour, and c) shows the position after half a complete tour and the end position. The movement is symmetrical so the first half of the tour and the second half of the tour are identical but mirrored. 1 is the diagonal evacuation screw conveyor, 2 is the centre cone, S is the sweep conveyor, and 10 is the first joint the fixed pivot point of the connection link L, A is the adapter to attach the sweep conveyor S to the connection link L. 20 is the additional, second link arm. The dotted arrow γ indicates the circular pathway of the joint 11 at the movable pivot point of the sweep conveyor S. The black spots indicate joints with fixed positions on the holder H, the connection link being mounted on the first joint 10 and the second link 20 being mounted on the fourth joint 21, so that they can turn around the joints. The striped spot is the second joint 11 connecting the second end 84 of the connection link L to the movable pivot point of the sweep conveyor S. The white spot is the fifth joint 22 where the second end of the second link 20 is connected to the sweep conveyor S. Its position is close to the second joint 11 at the movable pivot point of the sweep conveyor S but pushed somewhat towards the peripheral end 82 of the sweep conveyor S. The right positioning of the first, second, fourth and fifth joints 10, 11, 21 and 22, and the right lenghts of the connection link L and the second link 20, leads the second link 20 to force the sweep conveyor S, as it advances its peripheral end 82, driven by the traction wheel 5, around the inside of the silo wall 72, to push the connection link L so that the second joint 11 at the movable pivot point of the sweep conveyor S is moved along a pathway indicated by the dotted arrow γ in a way that its sideways movement allows the sweep conveyor S to reach 360 degrees around the floor 71 without being stopped by the diagonal evacuation screw conveyor 1. In order to avoid that one of the first, second fourth and fifth joints 10, 11, 21 or 22, start to turn the wrong way after half a full tour, when the sweep conveyor S, the connection link L and the second link 20 are all aligned, two or more of the first, second, fourth and fifth joints 10, 11, 21 and 22, on the sweep conveyor S and on the holder H can be equipped with springs that push them to turn in the right direction.

FIG. 8 illustrates the solution A2 with a second link 20 controlling the movement of the connection link L, as seen from above, for the reversed circular movement option. The figure illustrates only the central area 77 in the middle of the silo 70, so the silo wall 72 is not seen in the figure as it is more distant. In order to simplify the figure, a holder that holds the installation has not been drawn, however it can still be present. In the figure, the illustrations show different positions of the connection link L and the sweep conveyor S: a) shows the starting position, b) shows the position after one quarter of a full tour, c) shows a position between one quarter and half of a full tour, and d) shows the position after half a complete tour. The movement is symmetrical so the first half of the tour and the second half of the tour are identical but mirrored. 1 is the diagonal evacuation screw conveyor, 2 is the centre cone, S is the sweep conveyor, and 10 is the first joint at the fixed pivot point of the connection link L, A is the adapter to attach the sweep conveyor S to the connection link L. 20 is the additional second link. The dotted arrow γ indicates the circular pathway of the second joint 11 at the movable pivot point of the sweep conveyor S. The black spots indicate joints with fixed positions on the holder H, the connection link being mounted on the first joint 10 and the second link 20 being mounted on the fourth joint 21, so that they can turn around the joints. The striped spot is the second joint 11 connecting the second end of the connection link L to the movable pivot point of the sweep conveyor S. The white spot is the fifth joint 22 where the second end of the second link 20 is connected to the sweep conveyor S. Its position is close to the second joint 11 at the movable pivot point of the sweep conveyor S but pushed somewhat towards the peripheral end 82 of the sweep conveyor S. The positioning of the joints, and the lenghts of the connection link L and the second link 20, leads the second link 20 to force the sweep conveyor S, as it advances its peripheral end 82, driven by the traction wheel 5, around the inside of the silo wall 72, to push the connection link L so that the second joint 11 at the movable pivot point of the sweep conveyor S is moved along the pathway indicated by the dotted arrow γ in a way that its sideways movement allows the sweep conveyor S to reach 360 degrees around the silo floor 71 without being stopped by the diagonal evacuation screw conveyor 1. In order to avoid that one of first, second, fourth and fifth joints 10, 11, 21 and 22, starts to turn the wrong way after half a full tour, when the sweep conveyor S, the connection link L and the second link 20 are all aligned, two or more of the first, second, fourth and fifth joints 10, 11, 21 and 22, on the sweep conveyor S and on the holder H can be equipped with springs that push them to turn in the right direction.

FIG. 9 is an illustration with an example of how the solution A2 with the second link 20 with the reversed circular movement of the sweep conveyor S. The figure illustrates only the central area 77 in the middle of the silo 70, so the silo wall 72 is not seen in the figure as it is more distant. L is the connection link and 20 is the additional second link. 1 is the diagonal evacuation screw conveyor, 2 is the central cone in the silo floor 71, S is the sweep conveyor, 11 is the second joint at the movable pivot point of the sweep conveyor S, 4 is the motor drive of the sweep conveyor, 10 is the first joint at the fixed pivot point of the connection link L. H is the the holder, on which the connection link L, and the mechanism 8 that the link L is part of, are mounted. A is the adapter to attach the sweep conveyor S to the connection link L, 6 is a sixth joint to allow vertical lifting of the peripheral end 82 of the sweep conveyor S, 7 is a device to adjust the height of the central end 81 of the sweep conveyor S. 21 and 22 are the fourth and fifth joints at the first and second end, respectively, of the second link 20.

B. Solutions Using Wheels to Control the First and Second Angles α and β at the First and Second Joints 10 and 11 of the Connection Link L A wheel 32 is placed with its axis aligned with the second joint 11 at the movable pivot point of the sweep conveyor S. This wheel is called the second wheel 32 and it follows the same movement as the sweep conveyor S because it has its axis in the second joint 11 through which it is fixed to the adapter A and thus it is fixed to the sweep conveyor S. As the traction wheel 5 at the peripheral end 82 of the sweep conveyor S forces the sweep conveyor S to advance along the inner wall 72 of the silo 70, the second wheel will thus follow the same movement. Due to the location of the second wheel 32 at the second joint 11 at the second end 84 of the connection link, the connection link L will force the second wheel 32 either to be in contact with a first wheel 31 that is fixed to the holder H, having its center aligned with the axis of the first joint 10 connecting the connection link L to the holder H, see FIGS. 10 and 11, or to be in contact with a fixed circular bow 38 with an inner surface with high friction see FIG. 13. The arrangement is made in a way that as the second wheel 32 connected to the sweep conveyor S starts to turn, as the sweep conveyor is moving forward, and the the friction either between the fixed first wheel 31 and the second wheel 32, or between the fixed bow 38 and the second wheel 32, alternatively, will force the connection link L to move and turn sideways to allow the sweep conveyor S to turn 360 degrees around the silo 70 without being hindered by the diagonal evacuation screw conveyor 1. In order to eliminate any sliding between the first and second wheels 31 and 32 or between the second wheel 32 and the circular bow 38, it is important that the first and second wheels 31 and 32 and the fixed bow 38 have a very high friction in contact with each other, so that they do not slide when the movement of the sweep conveyor is putting a force on the second wheel 32 to turn. For this reason, it is preferred to use wheels in the form of cogwheels, and a bow in the form of a circular pinion rack. Another alternative could be to have rubber surfaces with a high friction.

The solution B1 describes the straight circular movement, see the FIGS. 10, 11 and 12 for different views and variants. The solution B2 describes the reversed circular movement, see FIGS. 13 and 14 for two variants. Observe that adding one, or another odd number, of wheels in a series, reverses the rotation direction of the last wheel, whereas adding two or another even number of wheels in a series does not reverse the rotation direction of the last wheel. The distance over which the movement or torque shall be transferred can be adjusted in several ways: By altering the diameter of the wheels; by adding two extra wheels in a series; by adding a connection with a belt or a chain, with high friction to avoid any sliding.

It can be noted that with the described solutions, it is an advantage to have a protection like a plate or small hood above the wheel mechanisms so that the wheels can rotate freely without getting anything of the material 74 stored in the silo 70 to get stuck around and between the wheels.

FIG. 10 shows an example of a design for the solution B1, for the straight circular movement made with wheels, here with an example using cogwheels, as seen from the side. The figure illustrates only the central area 77 in the middle of the silo 70, so the silo walls 72 are not seen in the figure as they are more distant. 1 is the diagonal evacuation screw conveyor, 2 is the centre cone in the silo floor 71, S is the sweep conveyor, H is the holder, A is the adapter to attach the sweep conveyor S to the connection link L through the second joint 11, 6 is a sixth joint to allow vertical lifting of the peripheral end 82 of the sweep conveyor S. L is the connection link, 10 is the first joint at the fixed pivot point of the connection link L, 11 is the second joint at the movable pivot point of the sweep conveyor at the second end 84 of the the connection link L and its connection point to the sweep conveyor S, 30 is the wheel mechanism, the second wheel 32 is connected to the sweep conveyor S through the axis at the second joint 11 at the movable pivot point of the sweep conveyor, the axis is rigidly mounted on the adapter AS, and the second wheel 32 thus follows the movement of the sweep conveyor S. The first wheel 31 is fixed and centered along the axis of the first joint 10 in the fixed pivot point of the connection link L, on the holder H. The first wheel 31 is fixed to the holder (as illustrated by a dotted line symbolizing a pin or bolt fixing the wheel to the upper part of the holder) so that it cannot rotate. In the design example in FIG. 10, we illustrate a simple variant with two cog wheels, preferably with the same diameter. The diameter of the two wheels is such that the wheels are in touch with eachother, by being held together by the connection link L, and they are arranged so that they cannot slide on eachother, preferably by the use of cogwheels, or alternatively by the use of wheels with a high friction between them, for example by having a rubber surface. Then if the sweep conveyor S is running clock-wise around the inside of the silo 70 thanks to the rotation of the traction wheel 5 at the peripheral end 82 of the sweep conveyor S, the second wheel 32 will turn clockwise with the same angle frequency as the sweep conveyor S and, by the interaction of the cogs or by the friction between the wheels, the second wheel 32 will be forced to roll on the surface of the fixed first wheel 31 and thus the connection link L will be forced to turn. The connection link L is keeping the right distance between the cog wheels, so that when the second wheel 32 is forced to rotate, as the traction wheel 5 of the sweep conveyor S pushes the sweep conveyor S to move around inside the silo wall 72, the second wheel 32 will follow the circular path of the circumference of the first wheel 31 and therefore it will force the connection link L to turn around the first joint 10 at the fixed pivot point of the connection link L. The dotted arrows in FIG. 10 illustrate how the different components can be made adjustable: a) To adjust the distance from the first joint 10 at the fixed pivot point of the connection link L to the diagonal evacuation screw conveyor 1, b) To adjust the height above the silo floor 71 of the central end 81 of the sweep conveyor S, c) To adjust the distance between the peripheral end 82 of the sweep conveyor and the inner silo wall 72, and d) To allow to lift up the peripheral end 82 of the sweep conveyor S, thanks to the sixth joint 6 The point where the adapter A is fixed to the sweep conveyor S can be made wherever it is suitable from a construction point of view, as a lot of variants of sweep conveyors exist.

FIG. 11 shows a solution for B1, for the straight circular movement, as seen from above. The wheels are preferably cogwheels. In order to simplify the figure, a holder that holds the installation has not been drawn, however in fact it can still be present, as illustrated in FIG. 12. The figure illustrates only the central area 77 in the middle of the silo 70, so the silo walls 71 are not seen in the figure as they are more distant. The FIG. 11 illustrates the movement in three different positions: a) the starting position, b) an intermediate position just before half of a tour, which shows how the mechanism changes its first and second angles $\alpha$ and $\beta$ while peripheral end 82 of the the sweep conveyor S is being driven around by the peripheral traction wheel 5 of the sweep conveyor S, and c) the end position after a complete tour of 360 degrees. 1 is the diagonal evacuation screw conveyor, 2 is the central cone in the silo floor, S is the sweep conveyor, A is the adapter to attach the sweep conveyor to the connection link L. L is the connection link on which the wheels are mounted, 10 is the first joint at the fixed pivot point of the connection link L, 11 is the second joint at the movable pivot point of the sweep conveyor S. The first wheel 31 is immobile, connected to and fixed on the holder H, the second wheel 32 is the wheel rigidly connected to the sweep conveyor S through the adapter A (see for example FIG. 10). The dotted line $\gamma$ illustrates the pathway of the second joint 11 at the movable pivot point of the sweep conveyor S, and at the same time it illustrates the change of the first angle $\alpha$ of the connection link L, as the second wheel 32 rolls around the immobile first wheel 31 while being pushed by the movement of the sweep conveyor S as its peripheral traction wheel 5 is pushing forward along the inside of the silo wall 72. In all the drawings a-c in FIG. 11, the rotation of the wheels is illustrated by bold arrows that are following the wheels as if they were painted on them. If the wheels have the same diameter, the first and second angles $\alpha$ and $\beta$ in FIG. 5 will change equally. As the change of angle of progression of the sweep conveyor $\rho$ is the sum of the changes of the first and second angles $\alpha$ and β, this means that when the connection link L has turned 180 degrees (half of a complete tour), the sweep conveyor S will have turned 360 degrees (a complete tour).

In order to allow smaller wheels than in FIG. 11, where the radii of the first and second wheels 31 and 32 together have to cover the whole gap between the two ends of the connection link L, a chain or a belt can be used, see the construction in FIG. 12.

FIG. 12 shows an example of how the solution B1, for the straight circular movement made with wheels, can be made with smaller wheels and a connection with a chain or a belt. The illustration shows a solution as seen from the side. The figure is focusing on the area around the link mechanism 8, so only part of the holder H and the adapter A connecting the connection link L with the sweep conveyor S are visible. 10 is the first joint at the fixed pivot point of the connection link L, 11 is the second joint at the movable pivot point of the sweep conveyor S and its associated axis, H is the holder, A is the adapter to attach the sweep conveyor S to the connection link L through the second joint 11. 37 is an extra axis and bearing where the axis can rotate freely in the bearing, that is positioned on the connection link L, 39 is a chain or a belt. L is the connection link, 31 is the first wheel fixed to the holder centered in the first joint 10 at the fixed pivot point of the connection link L, the second wheel 32 is connected to the sweep conveyor S, the third and fourth wheels 33 and 34 are extra wheels introduced on the extra axis 37. The solution in FIG. 12 is an alternative to the earlier described solution with wheels, where first and second wheels 31 and 32 have their axes at the first and second joints 10 and 11 at the fixed and movable pivot points at the first and second ends 83 and 84 of the connection link L, and where the mutual contact between the first and second wheels 31 and 32 is reached by adapting the diameter of the wheels, so that the sum of the radii of both wheels reaches between the first and second joints 10 and 11 at the respective ends of the connection link L. Instead, smaller wheels are used. The third wheel 33 rolls around the fixed first wheel 31 as the sweep conveyor S is propelled around the inside of the silo wall 72, however unlike the previous solution, the third wheel 33 is not fixed on the adapter A, but it is connected through the axis 37 to the fourth wheel 34, that is connected with a chain or a belt 39 to the second wheel 32 that is fixed on the adapter A. Note that it is also possible to reach this solution by mirroring the mechanism, so that the two directly connected wheels are at the end of the connection link L that is closest to the second joint 11 at the movable pivot point of the sweep conveyor S, and that the chain or belt 39 connects these with the first joint 10 at the fixed pivot point of the connection link L.

FIG. 13 shows a solution for B2, for the reversed circular movement, as seen from above. The second wheel 32 is preferably a cogwheel and the circular surface 38 around which the wheel is in contact with is preferably a curved pinion rack. In order to simplify the figure, a holder that holds the installation has not been drawn, however in fact it can still be present, as illustrated in FIG. 12. The FIG. 13 illustrates only the central area 77 in the middle of the silo 70, so the silo wall 72 is not seen in the figure as it is more distant. The FIG. 13 illustrates the movement in three different positions: a) the starting position, b) an intermediate position just before half of a tour, which shows how the mechanism 8 changes its first and second angles α and β while being driven around by the peripheral traction wheel 5 of the sweep conveyor S, and c) the end position after a complete tour of 360 degrees. 1 is the diagonal evacuation screw conveyor, 2 is the central cone in the silo floor 71, S is the sweep conveyor, A is the adapter to attach the sweep conveyor S to the connection link L, 38 is a circular surface to which the wheel is in contact with at a high friction, preferably a pinion rack when the wheel is a cogwheel, or the circular surface 38 and/or the second wheel 32 can be covered with rubber for high friction, in order to avoid sliding that would result in sub-optimal angles. L is the connection link on which the second wheel 32 is mounted at its second end 84, 10 is the first joint at the fixed pivot point of the connection link L, 11 is the second joint at the movable pivot point of the sweep conveyor S. The second wheel 32 is centered in the second joint 11, connected to the sweep conveyor S through the adapter A (see for example FIG. 10). The dotted line γ illustrates the pathway of the second joint 11 at the movable pivot point of the sweep conveyor S, as well as the change of the first angle α of the connection link L, as the second wheel 32 rolls around the circular surface or pinion rack 38 while being pushed by the movement of the sweep conveyor S as its peripheral traction wheel 5 is pushing forward along the inside of the silo wall 72. If the length of the circular friction surface 38 is at least as long as the circumferance of the second wheel 32, the sweep conveyor S will be able to rotate 360 degrees without being hindered by the diagonal evacuation screw conveyor 1. The radius of the inside circular surface is equal to the distance between the center of the axes of the first joint 10 and the second joint 11 at each end of the connection link L, plus the radius of the second wheel 32.

FIG. 14 shows an alternative solution for B2, the reversed circular movement, as seen from above. The first, second and third wheels 31, 32 and 33 are preferably cogwheels. In order to simplify the figure, a holder that holds the installation has not been drawn, however in fact it can still be present, as illustrated in FIG. 12. The figure illustrates only the central area 77 in the middle of the silo 70, so the silo walls 72 are not seen in the figure as they are more distant. The FIG. 14 illustrates the movement in three different positions: a) the starting position, b) an intermediate position just before half of a tour, which shows how the mechanism 8 changes its first and second angles α and β while being driven around by the peripheral traction wheel 5 of the sweep conveyor S, and c) the end position after a complete tour of 360 degrees. 1 is the diagonal evacuation screw conveyor, 2 is the central cone in the silo floor 71, S is the sweep conveyor, A is the adapter to attach the sweep conveyor S to the connection link L. L is the connection link on which the first, second and third wheels 31, 32 and 33 are mounted. The first wheel 31 is immobile, connected to and fixed on the holder H and centered in the first joint 10 at the fixed pivot point of the connection link L, the second wheel 32 is connected to the sweep conveyor S through the adapter A (see for example FIG. 10) and the third wheel 33 is an additional wheel that in this example is in contact with both the first and second wheels 31 and 32, having the purpose to reverse the direction of the rotation which is necessary for the reversed circular movement. The dotted arrow γ in FIG. 14 illustrates the pathway of the second joint 11 at the movable pivot point of the sweep conveyor S, as the connection link L moves around the first joint 10 at the fixed pivot point, while being pushed by the movement of the sweep conveyor S as its peripheral traction wheel 5 is pushing forward along the inside of the silo wall 71. If the diameter of the second wheel 32 is one third of the diameter of the first wheel 31, then the sweep conveyor S will turn a complete tour, 360 degrees, while the connection link L moves half of a tour, 180 degrees, from its left to its right position. The diameter of the third wheel 33 can be chosen arbitrarily.

C. Solutions Using Hydraulic, Pneumatic or Electric Actuators to Control the First and Second Angles α and β at the First and Second Joints 10 and 11 of the Connection Link L Instead of cogwheels, as in the solutions under B above, double acting hydraulic or pneumatic actuators, active in both directions, each one with two connections for hoses (one to turn right and one to turn left), can be used to control the first and second angles α and β in FIG. 5. See FIGS. 15 and 16 that illustrate this type of solution. The first actuator 41 is placed in the first joint 10 at the fixed pivot point of the connection link L, to control the first angle α between the connection link L and the diagonal evacuation screw conveyor 1 (and the mounting holder H). The second actuator 42 is placed in the second joint 11 at the movable pivot point of the sweep conveyor S, to control the second angle β between the sweep conveyor S and the connection link L. Their action in each joint is arranged by fixing the first and second actuators 41 or 42 on one side of the respective joint, and its respective actuator arm 43 or 44, on the other side of the joint, so that an external force acting to turn the joint (for example created by the torque on the sweep conveyor S created by the rotation of its peripheral traction wheel 5) will create a pressure at one of the hydraulic or pneumatic connections of the actuator and a depression at the other connection. The pressure from one of the connections will transfer through a hydraulic or pneumatic hose 45 to one of the connections of the other actuator, that will be forced to turn, and at the same time it will create a pressure on its other hydraulic or pneumatic connection that will transfer back to the depressed connection of first actuator and further push its associated joint in the same direction as the external force was initially exerted. The torque on the sweep conveyor S will thus force the first and second actuators 41 and 42 to control the first and second angles α and β in a mutual master-slave relation. For the straight circular movement, C1, identical actuators can preferably be used, and thus a movement identical to the one in solution B1 is achieved. For the reversed circular movement, C2, there should preferably be around 1:3 rotation speed difference so that the second actuator 42 connected to the sweep conveyor S moves three times faster for the same volume of liquid or gas moved through the control valves than the angular motion of the first actuator 41 at the first joint 10 at the fixed pivot point of the connection link L. Then the movement of the sweep conveyor S becomes identical with the two examples for solution B2.

FIG. 15 shows an illustration of the solution C1 with hydraulic or pneumatic actuators, for the straight circular movement, as seen from the side. The figure illustrates only the central area 77 in the middle of the silo 70, so the silo walls 72 are not seen in the figure as they are more distant, as well as the sweep conveyor S. 10 is first joint at the the fixed pivot point of the connection link L, and its associated axis, 11 is the second joint at the movable pivot point of the sweep conveyor S, and its associated axis. H is the holder for mounting of the connection link L, A is the adapter to attach the sweep conveyor S to the connection link L. 41 is the first actuator, connected to the first joint 10 at the fixed pivot point of the connection link L, 42 is the second actuator, connected to the second joint 11 at the movable pivot point of the sweep conveyor S. 43 and 44 are actuator arms of the first and the second actuator 41 and 42, respectively and 45 indicates the two hydraulic or pneumatic hoses connecting the first and second actuators 41 and 42 with each other. In the example in FIG. 15, the first actuator 41 is fixed on the holder, and its actuator arm 43 is fixed on the connection link L, the second actuator 42 is fixed to the adapter A to connect the sweep conveyor S to the connection link L, and its actuator arm 44 is fixed on the connection link L. Observe that with this setup, the hoses must be crossed, so that the right-way connection of the first actuator 41 is connected to the right-way connection of the second actuator 42, and the left-way connection of the first actuator 41 is connected to the left-way connection of the second actuator 42, to arrange that the two actuators turn in different directions to reach that the first and second angles α and β are turned in the same direction according to FIGS. 5 and 16. If one of the actuators is instead reversely mounted on the connection link L, and fixing its actuator arm 43 or 44 on the other side of the concerned joint 10 or 11, the hoses must not be crossed to reach the same angular movement in the the two joints, so the right-way connections of the first actuator 41 should be connected to the left-way connection of the second actuator 42, and vice-versa.

FIG. 16 illustrates the solution C1 with hydraulic or pneumatic actuators, for the straight circular movement, as seen from above. The figure illustrates only the central area 77 in the middle of the silo 70, so the silo walls 72 are not seen in the figure as they are more distant, as well as the sweep conveyor S. 10 is the first joint at the fixed pivot point of the connection link L, and its associated axis, 11 is the second joint at the movable pivot point of the sweep conveyor S, and its associated axis. H is the holder for mounting of the connection link L, A is the adapter to attach the sweep conveyor S to the connection link L. 41 is the first actuator, connected to the first joint 10 at the fixed pivot point of the connection link L, 42 is the second actuator, connected to the second joint 11 at the movable pivot point of the sweep conveyor S. 43 is the actuator arm of the first actuator 41 and 44 is the actuator arm of the second actuator 42.45 indicates the hydraulic or pneumatic hoses. In this example in FIG. 16, the first actuator 41 is fixed on the holder, and its actuator arm 43 is fixed on the connection link L, and the second actuator 42 is fixed to the adapter A to connect the sweep conveyor S to the connection link, L, and its actuator arm 44 is fixed on the connection link L, the other actuator is fixed on the frame, and its actuator arm is fixed on the link. Observe that the hoses are crossed to arrange that the two angles are turned in the same direction. The dotted arrows illustrate the turning of the joints in the same direction, upwards or clockwise in the figure, as for the case with the straight circular movement.

As an additional variant of the solution C, the hydraulic or pneumatic actuators can be replaced by electric actuators that can be steered with any kind of control strategy, but preferably a signal that steers the actuators so that the first and second angles α and β are the same. This can best be achieved with only one electric actuator placed at one of the first and second joints 10 or 11, as the angle of the other joint will automatically be controlled by the movement of the sweep conveyor S driven by its peripheral traction wheel 5. If the actuator is mounted to control the first angle α in the first joint 10, then it would preferably be steered by an angle sensor for the second angle β in the second joint 11. If the actuator is mounted to control the second angle β in the second joint 11, then it would preferably be steered by an angle sensor for the first angle α in the first joint 10. For both cases, the preferable control strategy is to let the two angles be equal.

D. Solutions Using a Chain, a Wire or a Belt, to Control the First and Second Angles α and β at the First and Second Joints 10 and 11 of the Connection Link L The movements illustrated for solutions B1 and B2 can also be achieved by the use of a chain, a belt or a wire 39 between the first and second wheels 31 and 32. See FIG. 17 for a solution with a straight circular movement, D1, and FIG. 18 for a solution with the reversed circular movement, D2.

FIG. 17 illustrates an example of solution D1 for the straight circular movement, as seen from above. The figure illustrates how the first and second angles α and β of the first joint 10 at the fixed pivot point of the connection link L and the second joint 11 at the movable pivot point of the sweep conveyor S can be collectively controlled by the use of a closed-loop chain, a belt, or a wire, connecting the first and second wheels 31 and 32 mounted in the first and second joints 10 and 11 of the connection link L. The figure illustrates only the central area 77 in the middle of the silo 70, so the silo walls 72 are not seen in the figure as they are more distant, as well as the sweep conveyor S. 10 is the first joint at the fixed pivot point of the connection link L, and its associated axis, 11 is the second joint at the movable pivot point of the sweep conveyor S, and its associated rotation axis, H is the holder for mounting of the connection link L, A is the adapter to attach the sweep conveyor S to the connection link L. Like for the solution B1, the second wheel 32 is connected to the sweep conveyor S through the adapter A, and the first wheel 31 is immobile, fixed to the holder holding the connection link L. When the motion forward of the peripheral traction wheel 5 of the sweep conveyor S will force the peripheral end 82 of the sweep conveyor S to advance around the inner wall 72 of the silo 70, the torque generated on the sweep conveyor S will force the second wheel 32 to turn clockwise in the figure above, which will create a tension in the part of the chain/belt/wire 39 indicated with a) in the figure, and it will lead to a relaxation in the part of the chain/belt/wire 39 on the other side, indicated with a b) in the figure. This imbalance will transfer the torque to the connection link L, that will be forced to also turn clockwise in the figure. This will force the second joint 11 at the movable pivot point of the sweep conveyor S to turn clockwise, and it will create exactly the same movement of the sweep conveyor S, as for the solution B1. The rotation of the first and second wheels 31 and 32 is illustrated by bold arrows that are following the first and second wheels 31 and 32 as if they were painted on them, to visualize their individual angles in the position shown in the figure.

FIG. 18 illustrates an example for a solution D2, with the reversed circular movement of the sweep conveyor S, as seen from above. The figure illustrates how the angles can be collectively controlled by the use of a closed-loop chain, a belt, or a wire 39, connecting first and second wheels 31 and 32 mounted in the first and second joints 10 and 11 of the connection link L. The figure illustrates only the central area 77 in the middle of the silo 70, so the silo walls 72 are not seen in the figure as they are more distant, as well as the sweep conveyor S. In order to simplify the figure, a holder that holds the installation has not been drawn, however in fact it can still be present, as illustrated in FIG. 12. 1 is the diagonal evacuation screw conveyor, 2 is the central cone in the silo floor 71, S is the sweep conveyor, 10 is the first joint at the fixed pivot point of the connection link L, and its associated axis, 11 is the second joint at the movable pivot point of the sweep conveyor S, and its associated rotation axis, A is the adapter to attach the sweep conveyor S to the connection link L. The first wheel 31 is immobile and fixed to the holder holding the connection link L, the second wheel 32 is connected to the sweep conveyor S through the adapter A. When the motion forward of the peripheral traction wheel 5 of the sweep conveyor S will force the peripheral end 82 of the sweep conveyor S to advance around the inner wall 71 of the silo 70, the torque generated on the sweep conveyor S will force the second wheel 32 to turn clockwise in the figure, which will create a tension in the part of the chain/belt/wire 39 indicated with a) in the figure, and it will lead to a relaxation in the part of the chain/belt/wire 39 on the other side, indicated with a b) in the figure. This imbalance will transfer the torque to the connection link L, that will be forced to turn counter-clockwise in the figure. The dotted arrow γ in FIG. 18 indicates the circular pathway followed by the second joint 11 at the movable pivot point of the sweep conveyor S. If the diameter of the first wheel 31 is three times as big as the diameter of the second wheel 32, then the sweep conveyor will make one complete tour, 360 degrees, when the connection link L travels 180 degrees from its left to its right position. This will force the second joint 11 at the movable pivot point of the sweep conveyor S to follow exactly the same path, and it will create exactly the same movement of the sweep conveyor S, as for the solutions B2.

E: A Solution with a Divided Link Turning in Two Steps

This is an extension of the solutions B, C, and D, which can allow the sweep conveyor S to turn more than a complete tour of 360 degrees, and thus it can remove also the material 74 that otherwise can potentially be left below the diagonal evacuation screw conveyor 1. In principle it comprises using a third joint or link pivot 12 that divides the connection link L into a first, central part 13, connected at one end through the first joint 10 to the holder H at the fixed pivot point of the connection link L, and a second, peripheral part 14 that is connected to the sweep conveyor S at the second joint 11 at the movable pivot point of the sweep conveyor, these both parts being mutually connected in an additional third joint 12. Alternatively, a third, central link 13 and a fourth, peripheral link 14 connected to each other with one additional third joint 12 can be used: The third link 13 connected at its first end to the holder H at the first joint 10 at the fixed pivot point and to its second end through the third joint 12 to the fourth link 14, and this fourth link 14 is connected at its first end through the third joint 12 to the second end of the third link 13 and at its second end through the second joint 11 to the sweep conveyor S at the movable pivot point of the sweep conveyor S. Between the third link 13 and the fourth link 14, or analogously, between the first and the second parts 13 and 14 of the link, a third angle c is formed, so that the angle of progression of the sweep conveyor ρ relative to a horizontal projection of the diagonal evacuation screw conveyor 1 is the sum of the angles α β and ε. The length of the fourth link 14 does not have to be the same as the length of the third link 13, to give flexibility to adapt to various setups of the silo 70. The first, second and third joints 10 11 and 12, can be mutually controlled through any one of the mechanisms in the three solutions B, C, and D, however preferably by the straight circular movement. The third link 13 allows the sweep conveyor S to turn a complete turn around the silo, from a starting point of the third link 13, parallell to the diagonal evacuation screw conveyor 1, to an end point also parallel to the diagonal evacuation screw conveyor 1, but on its other side. The fourth link 14 allows some extra rotation so that the sweep conveyor S reaches behind and below the diagonal evacuation screw conveyor 1. This means that the control of the first, second and third angles α β and ε in the first, second and third joints 10 11 and 12 is achieved in two steps simultaneously, see the angles shown with dotted arrows in FIG. 19*d*). The angles of the rotation of the first, second and third joints 10, 11 and 12, do not necessarily need to be the same. Preferably the first angle α of the first joint 10 at the fixed pivot point of the third link 13 and the third angle c at the third joint 12 between the third and the fourth links 13 and 14 are the same, whereas the second angle β at the second joint 11 at the movable pivot point of the sweep conveyor S is for the solution E smaller than any one of the angles at the first and third joints 10 and 12. See an illustration of an example solution for this in FIG. 19, and an illustration of the extended reach below the diagonal evacuation screw conveyor S in FIG. 20. The control of the first, second and third angles works in analogy with the solutions B, C, and D, with the difference that the solution E has double mechanisms 8, one on the third link 13 and one on the fourth link 14, that individually work as the solutions in B, C, or D, and they are connected and mutually controlled by the gears in the third joint 12 between the third link 13 and the fourth link 14, see an explanation in FIG. 19.

FIG. 19 illustrates an example of how the solution E can be made using cogwheels. The figure illustrates only the central area 77 in the middle of the silo 70, so the silo walls 72 are not seen in the figure as they are more distant, as well as the sweep conveyor S. In order to simplify the figure, a holder that holds the installation has not been drawn, however in fact it can still be present, as illustrated in FIG. 12. 1 is the diagonal evacuation screw conveyor, 2 is the central cone in the silo floor 71, S is the sweep conveyor, 11 is the second joint at the movable pivot point of the sweep conveyor S and 10 is the first joint 10 at the fixed pivot point of the third link 13. 13 is the third link, 14 is the fourth link, 12 is the additional third joint or link pivot that connects the third link 13 and the fourth link 14. The first wheel 31 is fixed to the holder H, centered in the first joint 10 at the fixed pivot point of the central third link 13. The fifth wheel 35 is fixed to the fourth link 14, having its center and rotation point in the third joint 12. The first and fifth wheels 31 and 35 in FIG. 19 are in touch with each other so that when the third link 13 rotates around the first joint 10 of its fixed pivot point, the fifth wheel 35, and thus the fourth link 14, will be forced to rotate, and vice-versa. The sixth wheel 36 is fixed to the third link 13 but having the same rotation point 12 as the fifth wheel 35. The second wheel 32 is fixed to the sweep conveyor, and having its rotation point in the second joint 11 at the the movable pivot point of the sweep conveyor S. The second and sixth wheels 32 and 36 are in touch with each other so that when the fourth link 14 turns around the third joint 12, the second wheel 32 will be forced by the sixth wheel 36 to rotate. The result is that the first, second and third angles α, β and ε will be related so that their changes will be collectively controlled, and that when the sweep conveyor S is driven forward by its peripheral traction wheel 5, all the first, second and third joints 10, 11 and 12 will be forced to adapt, but still automatically keeping the relations between the first, second and third angles α, β and ε as determined by their different gearing. The gearing of the transfer of torque between the first and fifth wheels 31 and 35 can be different from the one for transfer of torque between the second and the sixth wheels 32 and 36, as illustrated in FIG. 19 by the different diameters of the second and sixth wheels 32 and 36 as compared to the relation between the first and fifth wheels 31 and 35. It is an advantage to have equal diameters of the first and fifth wheels 31 and 35 but to have the sixth wheel 36 smaller than the second wheel 32.

Note that the example solution in FIG. 19 with cogwheels does not include a chain like the reference 39 described in FIG. 12, however it is of course completely possible to use a chain also here, in order to reduce the size of the wheels. The illustration in FIG. 19 shows how different gearing in the first, second and third joints 10, 11 and 12 can be used to make possible that the second joint 11 at the movable pivot point of the sweep conveyor S turns less than the first and third joints 10 and 12, just enough to get sufficient reach below the diagonal evacuation screw conveyor 1.

FIG. 20 is an illustration of the approximate extended reach of the sweep conveyor S with the solution E with the third and fourth links 13 and 14. Note that the holder H and the link mechanism 8 have been omitted in this figure for simplicity. 1 is the diagonal evacuation screw conveyor, 2 is the central cone in the silo floor 71, a) is the sweep conveyor S in a possible starting position and b) is the sweep conveyor S in a possible end position. The dotted arrow in FIG. 20 illustrates the approximate pathway of the traction wheel 5 of the sweep conveyor S, as it progresses around the inside of the silo wall 72. In this way, also material 74 under the diagonal evacuation screw conveyor 1 will be removed.

F: A Solution with a Divided Link Turning in Two Steps, where the Central First Portion 51 of the Sweep Conveyor S is Following the Movement of the Fourth Link 14, with a Universal Joint Dividing the Sweep Conveyor S This solution allows that the material 74 is brought closer to the central cone 2 in the silo floor 71, which is an advantage if the cone 2 has a small diameter that makes it difficult to bring the material 74 straight into the cone 2 with the solution E, as the sweep conveyor S risks to be too much to the side of the cone 2. Then a sweep conveyor S can be used that is divided in a central first portion 51 and a peripheral second 52 portion, where the two parts are connected in a seventh joint 53. The central first portion 51 follows the movement of the fourth link 14 and thus it has the same angle as the fourth link 14. The movement of the peripheral second portion 52 of the sweep conveyor S is connected to the mechanism 8 exactly in the same way as for the sweep conveyor S in solution E. Below the second joint 11 at the movable pivot point of the peripheral second portion 52 of the sweep conveyor S, the conveyor is divided between its two parts in a seventh joint 53, where the torque of the conveyor or auger is transferred from the central first portion 51 to the peripheral second portion 52 of the conveyor or auger through a universal joint, that allows full power transmission in spite of the angled sweep conveyor S. See FIG. 21.

FIG. 21 is an illustration of the operation of the link mechanism 8 of solution F, with the example of the cogwheels. In order to simplify the figure, a holder that holds the installation has not been drawn, however in fact it can still be present, as illustrated in FIG. 12. 1 is the diagonal evacuation screw conveyor, 2 is the central cone in the silo floor 71, 10 is the first joint of the fixed pivot point of the third link 13, 11 is the second joint at the movable pivot point of the peripheral second portion 52 of the sweep conveyor S, 51 is the central first portion of the sweep conveyor S, 52 is the peripheral second portion of the sweep conveyor S. 13 is the third link, 14 is the fourth link, 12 is the third joint that connects the third and the fourth links 13 and 14. The first wheel 31 is fixed to the holder H, centered in the first joint 10 of the fixed pivot point of the third link 13. The fifth wheel 35 is fixed to the fourth link 14, having its center and rotation point in the third joint 12. The sixth wheel 36 is a wheel fixed to the third link 13, having its center and rotation point in the third joint 12. The first and fifth wheels 31 and 35 are in touch with each other so that when the third link 13 rotates around the first joint 10 at the fixed pivot point, the fifth wheel 35, and thus the fourth link 14, will be forced to rotate, and vice versa. The second wheel 32 is fixed to the peripheral second portion 52 of the sweep conveyor S, and having its rotation point in the second joint at the movable pivot point of the peripheral second portion 52 of the sweep conveyor S. The second and the sixth wheels 32 and 36 are in touch with each other so that when the fourth link 14 turns around the third joint 12, the second wheel 32 will be forced by the sixth wheel 36 to rotate. The result is that the first, second and third angles α, β and ε will be controlled, and that, when the sweep conveyor S is driven forward by its peripheral traction wheel 5, all the first, second and third joints 10 11 and 12 will be forced to adapt, but still automatically keeping the relations between the first, second and third angles α, β and ε as determined by their different gearing. The angles are illustrated in FIG. 19d), as they are analogous to the solution E. The gearing of the transfer of torque between the first and fifth wheels 31 and 35 in FIG. 21 can be different from the one from transfer of torque between the second and the sixth wheels 32 and 36, as illustrated in the figure by the different diameters of the second and sixth wheels 32 and 36, as compared to the first and fifth wheels 31 and 35. It is an advantage to have equal diameters of the first and fifth wheels 31 and 35 but to have the sixth wheel 36 smaller than the second wheel 32. The central first portion 51 of the sweep conveyor S is attached to and follows the fourth link 14. The power is transferred from the central first portion 51 of the sweep conveyor S, where the motor drive 4 is located, to the peripheral second portion 52 of the sweep conveyor S by a universal joint in the screw of the sweep conveyor, just where the screw passes the second joint 11 at the movable pivot point of the peripheral second portion 52 of the sweep conveyor S.

G. A Solution as a Complement to any One of the Solutions A-F, where the Sweep Conveyor S is Divided in a Central First Portion 51 and a Peripheral Second Portion 52, where the Central First Portion 51 of the Sweep Conveyor S is Angled Slightly Upwards Similar to the solution F, the sweep conveyor S is divided into a central first portion 51 and a peripheral second portion 52, connected by a seventh joint 53, with a fourth angle ζ between them and a universal joint transferring the power between the two parts of the screw. However the fourth angle ζ between the two portions 51 and 52 is here turning the central first portion 51 of the sweep conveyor S slightly upwards, and the fourth angle ζ is either permanent, or fixed and adjustable. The purpose is that the material 74 shall be lifted and thus it shall easier fall by gravity into the central cone 2 in the silo floor 71. This is an advantage when the central cone 2 has a small diameter so that the material 74 does not easily fall into the cone 2 from the point to which the material 74 is moved by the sweep conveyor S. This solution can also be used when there is no central cone in the silo floor 71, but the lower, central end of the diagonal evacuation screw conveyor 1 is just above the silo floor 71. Under the central first portion 51 of the sweep conveyor S, a pile of material 74 will build up when using this solution. When the pile has reached sufficiently high, stored material 74 will eventually start to fall into the diagonal evacuation screw conveyor 1.

FIG. 22 is an illustration of the solution where the central first portion 51 of the sweep conveyor S is slightly inclined upwards, in order to facilitate the material 74 to fall into the central cone 2 in the silo floor 71, also when the sweep conveyor S is not capable to lead the material 74 close enough if it would have been straight horizontal. 1 in FIG. 22 is the diagonal evacuation screw conveyor, 2 is the central cone in the silo floor 71, H is the holder on which the mechanism 8 with the sweep conveyor S is mounted, A is the adapter to attach the sweep conveyor S to the connection link L, 51 is the central first portion of the sweep conveyor S, 52 is the peripheral second portion of the sweep conveyor S, and 53 is the seventh joint which connects the central first portion 51 and the peripheral second portion 52 of the sweep conveyor S. L is the connection link.

H. Device for Suspension of the Sweep Conveyor S Before Filling the Silo 70

The following solution is a useful complement to all the above solutions, solving the problem described earlier with the starting position of the sweep conveyor when the floor 71 of the silo 70 is full with material 74 according to FIG. 3.

The problem is solved by two arrangements:

The first one allows lifting of the peripheral end 82 of the sweep conveyor S, by having a vertically rotatable mounting 6 of the sweep conveyor S at its central end 81, as shown in the examples in FIGS. 9 and 10, where the sixth joint 6 allows the vertical lifting.

The second one is a conveyor holder 60, preferably in the form of a fixed diagonal beam with its lower end fixed to the floor 71 or the holder H, close to the center of the silo 70, and its higher, peripheral, end is close to the silo wall 72. The peripheral end is held by a vertical support 61 preferably standing on the floor 71 close to the wall. The conveyor holder 60 is made so that the sweep conveyor S, when lifted up in its peripheral end 82, can be placed to rest on the conveyor holder, or alternatively that it can be attached to or hooked beside or under the conveyor holder. The vertical angle of the beam and its height at the peripheral end are made so that the sweep conveyor S, when attached to it, is above the surface 75 of the slope of material 74 with resting angle δ in the silo 70 when it is unloaded maximally with the diagonal evacuation screw conveyor 1, as illustrated in FIG. 3. Thus, it can be said that the sweep conveyor S is arranged to be pivoted upwards about the turnable joint 6 and to be attached to a conveyor holder 60 provided on the discharge apparatus 1 or standing on supports on the floor 71 or being attached to a silo wall 72, or a combination of these.

The whole arrangement is shown in FIG. 23.

The arrangement is used in the following way:

When the silo 70 is empty, as a preparation before new material 74 is being entered into the silo 70, the sweep conveyor S is placed on, or attached to, the conveyor holder 60. This has to be done in a way that it cannot accidentally fall down, for example by fixing it with a strap or chain, or locking it with a hook, a pin or similar. The conveyor holder can also have a permanent, fixed mechanic locking arrangement, where the locking arrangement can be easily released from a remote point by a handle, for example close to a hatch in the silo wall 72 from where it can be easily reached, or even outside the silo wall 72. In order to reduce the burden to lift the sweep conveyor S up to the conveyor holder 60, a simple winch, hoist, block or similar can be used to elevate the peripheral end 82 of the sweep conveyor S to its locking position.

Any parts sensitive for dust, for example the electric motor drive 4, have to be covered with, for example, a canvas for protection against the stored material.

All cables to the motor drive 4 have to be checked that they are well protected according to the regulations, and that they are well attached to the connection link L and the holder H all the way from the connection on the motor 4 to the point where it exits the silo 70. Otherwise it can be ripped off by the load of the material 74 above it, when the silo is being filled, or by the motion of the operating sweep conveyor S.

Then the silo 70 can be filled with material 74. The sweep conveyor S then becomes completely covered with material 74.

When the silo 70 is being unloaded, the diagonal evacuation screw conveyor 1 is first being used, until no more material 74 is falling by gravity down to the cone 2 at the center of the floor 71 (see the illustration of this situation in FIG. 3).

When having reached this point where the diagonal evacuation screw conveyor 1 cannot remove the remaining material 74 by itself, the sweep conveyor S has to be released. Depending on how it has been attached to the conveyor holder 60, this can be done by removing the strap, hook or pin, and by lifting it off from any support it may be placed on, to put it down and let it rest directly on the sloped surface 75 of the stored material 74. If needed, any canvas or similar placed to protect the sweep conveyor motor drive 4 from the stored material 74 is removed. If the motor 4 has no fixed electricity connection, a separate cable is introduced that has to be fixed in a safe way all the way from its entrance point into the silo 70 to the connection on the motor 4, in a way that it cannot be ripped off by the operation of the sweep conveyor S or by any parts of the mechanism 8 installed to secure the right movement of the connection link L. Then any person who has been operating in the silo 70 has to exit the silo 70.

At this point, the diagonal evacuation screw conveyor 1 and the sweep conveyor S can be turned on to operate simultaneously to automatically unload all the remaining material 74 in the silo 70. When the sweep conveyor S has reached a complete tour of 360 degrees, or completed its maximum reach, it is stopped.

The above approach means that the conveyor holder has to be strong enough to resist the pressure and load of both the attached sweep conveyor S, and all the material 74 above, and so that the sweep conveyor S is protected from being deformed by the pressure of the stored material 74 above it.

By this solution, both the very labour intensive operations associated with the prior art are being avoided, alternatively: Either having to enter and mount the sweep conveyor S into the silo 70 every time when it is needed and then having to dismount and remove it every time that the silo 70 will be filled again, or having to uncover the sweep conveyor S covered by the stored material 74, manually by a shovel, every time the unloading of the silo 70 has reached the point where the sweep conveyor S is needed.

It is an advantage to mount a vertical or steep bar 62 below the conveyor holder 60, that can serve to guide or steer the descent of the sweep conveyor S when it is digging into the material 74 below. This is to secure that the sweep conveyor S first digs down vertically until close above the floor 71, and when the sweep conveyor S gets off the lower end of the vertical bar 62, the traction wheel 5 of the peripheral end 82 of the sweep conveyor S reaches the floor and starts to moving the sweep conveyor S forward to advance along the inside of the silo wall 72. Without this guiding, the work of the running sweep conveyor S will result in a movement forward along the inside of the silo wall 72 already before the wheel 5 has reached the floor 71, and thus there will be material 74 left on the floor, unremoved. One way of arranging this guiding effect of the bar 62 is to attach a metal ear on the back side of the sweep conveyor S, that can glide around the bar 62 during the vertical or nearly vertical descent of the sweep conveyor S.

FIG. 23 is an illustration of an example of a conveyor holder 60 (illustrated with broad dotted lines in the figure) for suspension of the sweep conveyor S. In the example in the FIG. 23, the sweep conveyor S is attached below the conveyor holder. 1 in FIG. 23 is the diagonal evacuation screw conveyor, 2 is the central cone in the silo floor 71, S is the sweep conveyor, being lifted up in its peripheral end 82 and attached to the conveyor holder 60, H is the holder on which the mechanism 8 with the sweep conveyor S is mounted, A is the adapter to attach the sweep conveyor S to the connection link L. 61 is its vertical support at the peripheral end of the conveyor holder 60 close to the silo wall 72, 62 is the vertical or nearly vertical bar that guides the sweep conveyor S during its descent after the securing locks have been released.

A plurality of embodiments of the present invention are described above, having various components and modes of operation. It is to be noted, however, that features from the various embodiments described herein may freely be combined, unless it is explicitly stated that such a combination would be unsuitable.

The invention claimed is:

1. A sweep conveyor assembly for use in a silo or granary (70) having a floor (71) and a generally cylindrical wall (72) upstanding from the floor (71) and a discharge apparatus (1) for discharging material (74) from a centre of the floor (71) to an exterior location, the sweep conveyor (S) assembly comprising:
   a sweep conveyor (S) for transporting material (74) inside the silo (70) or granary towards the centre of the floor (71) where it can be discharged by the discharge apparatus (1),
   a holder (H), and
   a link mechanism (8) for connecting the sweep conveyor (S) to the holder (H), said link mechanism (8) comprising a connection link (L) having a first end (83) and a second end (84),
   said first end (83) being configured to be connected to the holder (H) at a fixed pivot point (10) and the sweep conveyor (S) being configured to be connected to the second end (84) of the connection link (L) at a movable pivot point (11), wherein
   the connection link (L) is arranged to rotate about the fixed pivot point (10), forming a first angle (α) between the connection link (L) and an axis extending along a geometrical centre of the holder (H),
   the sweep conveyor (S) is arranged to rotate about the movable pivot point (11), forming a second angle (β) between the sweep conveyor (S) and the connection link (L), whereby the movable pivot point (11) is moved to increase the reach of the sweep conveyor (S), and
   the link mechanism (8) is arranged to control a ratio between the first angle (α) and the second angle (β), and a magnitude of the first angle (α) and second angle (β) is controlled by an angular position of the sweep conveyor (S) such that said first angle (α) and second angle (β) are continuously mutually dependent to always rotate both said conveyor (S) and link (L) in the same direction together about said fixed pivot point (10).

2. A sweep conveyor assembly according to claim 1, wherein the link mechanism (8) controls a position of the connection link (L) and the sweep conveyor (S) during rotation so that the first angle (α) is a function of the second angle (β).

3. A sweep conveyor assembly according to claim 1, wherein the holder (H) is mounted on the floor (71) of the silo or granary (70), or on the discharge apparatus (1).

4. A sweep conveyor assembly according to claim 1, wherein the link mechanism (8) is permanently connected to the holder (H), and/or the sweep conveyor (S) is detachably mounted on the link mechanism (8).

5. A sweep conveyor assembly according to claim 1, wherein the sweep conveyor (S) is mounted to turn at least a complete 360° rotation within the silo (70) about said fixed pivot point (10).

6. A sweep conveyor assembly according to claim 1, wherein the conveyor (S) is mounted to pass underneath the discharge apparatus (1) during rotation.

7. A sweep conveyor assembly according to claim 1, wherein the link mechanism (8) comprises an electrical actuator, and said electrical actuator is arranged to control the relation between the first angle (α) and the second angle (β), and the electrical actuator comprises at least one electric actuator connected between the holder (H) and the first end (83) of the link (L), or connected between the sweep conveyor (S) and the second end (84) of the link (L).

8. A sweep conveyor assembly according to claim 1, wherein the link mechanism (8) comprises a second link (20) that is arranged to control the relation between the first angle (α) and the second angle (β), and the second link (20) has a first end (21) and a second end (22), said first end (21) configured to be connected at a fixed pivot point at a position on the holder (H) different from the fixed pivot point (10) of the connection link (L), said second end (22) configured to be connected to the sweep conveyor (S) at a movable pivot point at another position compared to the pivot point (11) where the connection link (L) is attached to the sweep conveyor (S).

9. A sweep conveyor assembly according to claim 1, wherein the sweep conveyor (S) is connected to the connection link (L) via a vertical connection (A) in such a way that the sweep conveyor (S) passes is beneath the connection link (L) during operation.

10. A sweep conveyor assembly according to claim 1, wherein the first angle (α) is equal to the second angle (β).

11. A sweep conveyor assembly according to claim 1, wherein the connection link (L) comprises a link pivot (12) so that the second end of the connection link (84, 14) can pivot in relation to the first end (83, 13) of the connection link (L), forming a third angle (ε) between said second (84, 14) and first ends (83, 13) of the connection link (L).

12. A sweep conveyor assembly according to claim 1, wherein the sweep conveyor (S) comprises a first (51) and a second (52) conveyor portion that are connected to each other by a sweep conveyor joint (53), the first conveyor portion (51) being configured to be connected to the link mechanism (8).

13. A sweep conveyor assembly according to claim 1, wherein the holder (H) is mounted to be tilted with respect to a vertical axis, such that an end of said conveyor (S) at least partially passes underneath said holder (H) upon rotation.

14. A sweep conveyor assembly according to claim 1, wherein the sweep conveyor (S) is arranged to be pivoted upwards about a turnable joint (6) and attached to a conveyor holder (60) provided on the discharge apparatus (1) or on the holder (H) or standing on supports on the floor (71) or being attached to a silo wall (72), or a combination of any of these.

15. A sweep conveyor assembly according to claim 1, wherein said first end (83) of said connection link (L) is connected to said fixed pivot point (10) by a fixed gear (31).

16. A sweep conveyor assembly according to claim 1, wherein the link mechanism (8) comprises a wire or chain or belt (39) actuator between the first end (83) and the second end (84).

17. A sweep conveyor assembly for use in a silo or granary (70) having a floor (71) and a generally cylindrical wall (72) upstanding from the floor (71) and a discharge apparatus (1) for discharging material (74) from a centre of the floor (71) to an exterior location, the sweep conveyor (S) assembly comprising:
a sweep conveyor (S) for transporting material (74) inside the silo (70) or granary towards the centre of the floor (71) where it can be discharged by the discharge apparatus (1),
a holder (H), and
a link mechanism (8) for connecting the sweep conveyor (S) to the holder (H), said link mechanism (8) comprising a connection link (L) having a first end (83) and a second end (84),
said first end (83) being configured to be connected to the holder (H) at a fixed pivot point (10) and the sweep conveyor (S) being configured to be connected to the second end (84) of the connection link (L) at a movable pivot point (11), wherein
the connection link (L) is arranged to rotate about the fixed pivot point (10), forming a first angle (α) between the connection link (L) and an axis extending along a geometrical centre of the holder (H),
the sweep conveyor (S) is arranged to rotate about the movable pivot point (11), forming a second angle (β) between the sweep conveyor (S) and the connection link (L), whereby the movable pivot point (11) is moved to increase the reach of the sweep conveyor (S),
the link mechanism (8) is arranged to control a ratio between the first angle (α) and the second angle (β), and a magnitude of the first angle (α) and second angle (β) is controlled by an angular position of the sweep conveyor (S),
the link mechanism (8) comprises at least two wheels arranged in rolling interaction with each other, and
the connection link (L) is formed between a center of rotation of each of two wheels, and the wheels are preferably cog wheels.

18. A sweep conveyor assembly for use in a silo or granary (70) having a floor (71) and a generally cylindrical wall (72) upstanding from the floor (71) and a discharge apparatus (1) for discharging material (74) from a centre of the floor (71) to an exterior location, the sweep conveyor (S) assembly comprising:
a sweep conveyor (S) for transporting material (74) inside the silo (70) or granary towards the centre of the floor (71) where it can be discharged by the discharge apparatus (1),
a holder (H), and
a link mechanism (8) for connecting the sweep conveyor (S) to the holder (H), said link mechanism (8) comprising a connection link (L) having a first end (83) and a second end (84),
said first end (83) being configured to be connected to the holder (H) at a fixed pivot point (10) and the sweep conveyor (S) being configured to be connected to the second end (84) of the connection link (L) at a movable pivot point (11), wherein the connection link (L) is arranged to rotate about the fixed pivot point (10), forming a first angle ($\alpha$) between the connection link (L) and an axis extending along a geometrical centre of the holder (H), the sweep conveyor (S) is arranged to rotate about the movable pivot point (11), forming a second angle ($\beta$) between the sweep conveyor (S) and the connection link (L), whereby the movable pivot point (11) is moved to increase the reach of the sweep conveyor (S), the link mechanism (8) is arranged to control a ratio between the first angle ($\alpha$) and the second angle ($\beta$), and a magnitude of the first angle ($\alpha$) and second angle ($\beta$) is controlled by an angular position of the sweep conveyor (S), the link mechanism (8) comprises a hydraulic or pneumatic actuator (41, 42, 45) or a wire or chain or belt (39) actuator between the first end (83) and the second end (84), the connection link (L) is formed between the fixed pivot point and the movable pivot point, and the hydraulic or pneumatic actuator (41, 42, 45) comprises a first hydraulic or pneumatic actuator (41) connected between the holder (H) and the first end (83) of the link (L), and a second hydraulic or pneumatic actuator (42) connected between the sweep conveyor (S) and the second end (84) of the link (L).

19. A sweep conveyor assembly for use in a silo or granary (70) having a floor (71) and a generally cylindrical wall (72) upstanding from the floor (71) and a discharge apparatus (1) for discharging material (74) from a centre of the floor (71) to an exterior location, the sweep conveyor (S) assembly comprising:

a sweep conveyor (S) for transporting material (74) inside the silo (70) or granary towards the centre of the floor (71) where it can be discharged by the discharge apparatus (1), a holder (H), and a link mechanism (8) for connecting the sweep conveyor (S) to the holder (H), said link mechanism (8) comprising a connection link (L) having a first end (83) and a second end (84), said first end (83) being configured to be connected to the holder (H) at a fixed pivot point (10) and the sweep conveyor (S) being configured to be connected to the second end (84) of the connection link (L) at a movable pivot point (11), wherein the connection link (L) is arranged to rotate about the fixed pivot point (10), forming a first angle ($\alpha$) between the connection link (L) and an axis extending along a geometrical centre of the holder (H), the sweep conveyor (S) is arranged to rotate about the movable pivot point (11), forming a second angle ($\beta$) between the sweep conveyor (S) and the connection link (L), whereby the movable pivot point (11) is moved to increase the reach of the sweep conveyor (S), the link mechanism (8) is arranged to control a ratio between the first angle ($\alpha$) and the second angle ($\beta$), and a magnitude of the first angle ($\alpha$) and second angle ($\beta$) is controlled by an angular position of the sweep conveyor (S), and the sweep conveyor (S) is essentially horizontal when mounted on the link mechanism (8), but one end portion (51) of the sweep conveyor (S) extends upwards at an angle ($\zeta$) from the horizontal direction, said end portion (51) being at the end configured to be connected to the link mechanism (8).

* * * * *